May 14, 1929.   M. RESEK   1,712,737
DUAL CONTROL HEATING SYSTEM
Filed Oct. 6, 1926   28 Sheets-Sheet 1

INVENTOR
Marc Resek
By Hull, Brock & Near
Attys.

May 14, 1929.

M. RESEK 1,712,737

DUAL CONTROL HEATING SYSTEM

Filed Oct. 6, 1926    28 Sheets-Sheet 8

Fig. 8

Inventor
Marc Resek
By Hull, Brock & West
Attys.

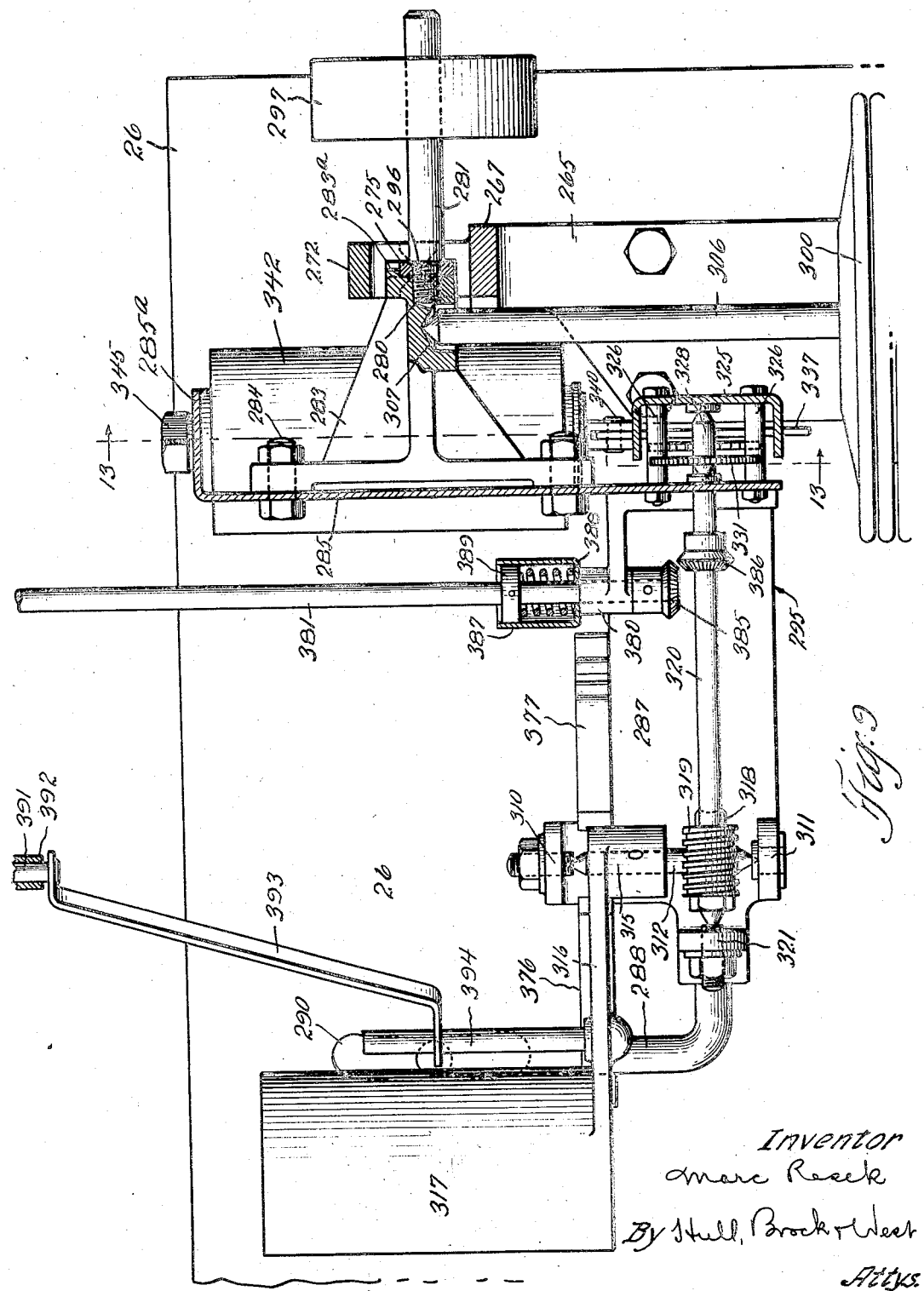

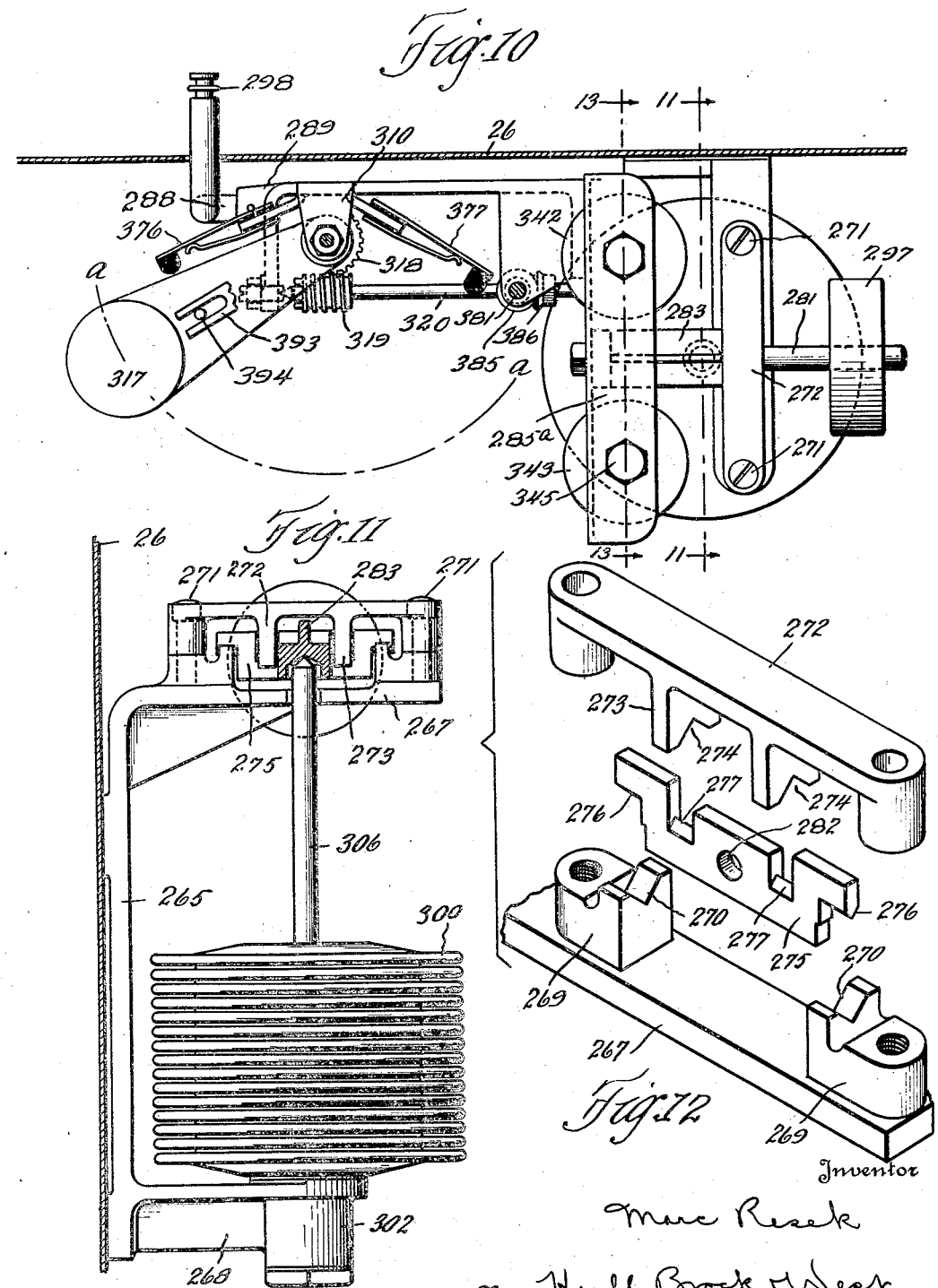

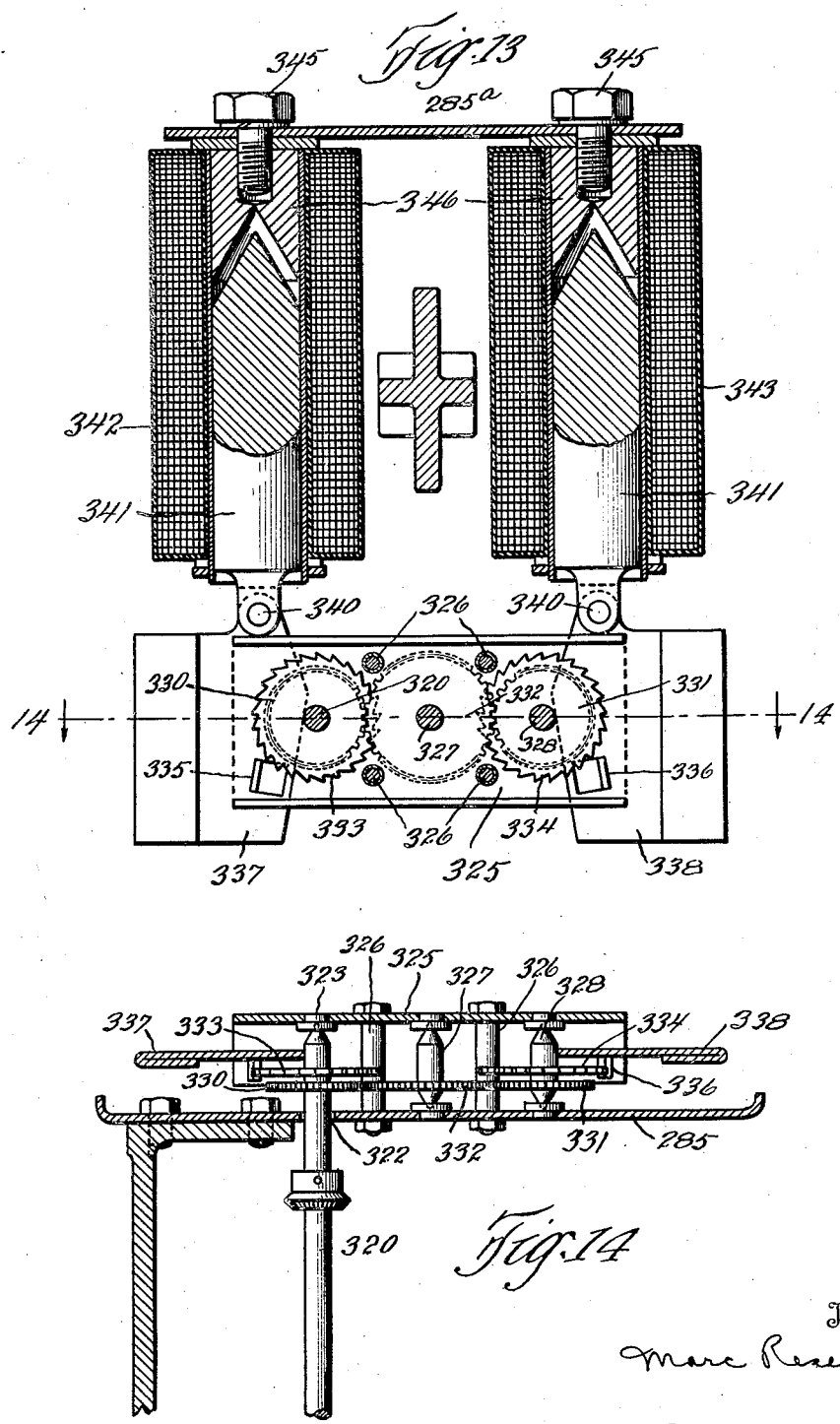

May 14, 1929.  M. RESEK  1,712,737
DUAL CONTROL HEATING SYSTEM
Filed Oct. 6, 1926  28 Sheets-Sheet 12

Inventor
Marc Resek
By Hull, Brock & West
Attys.

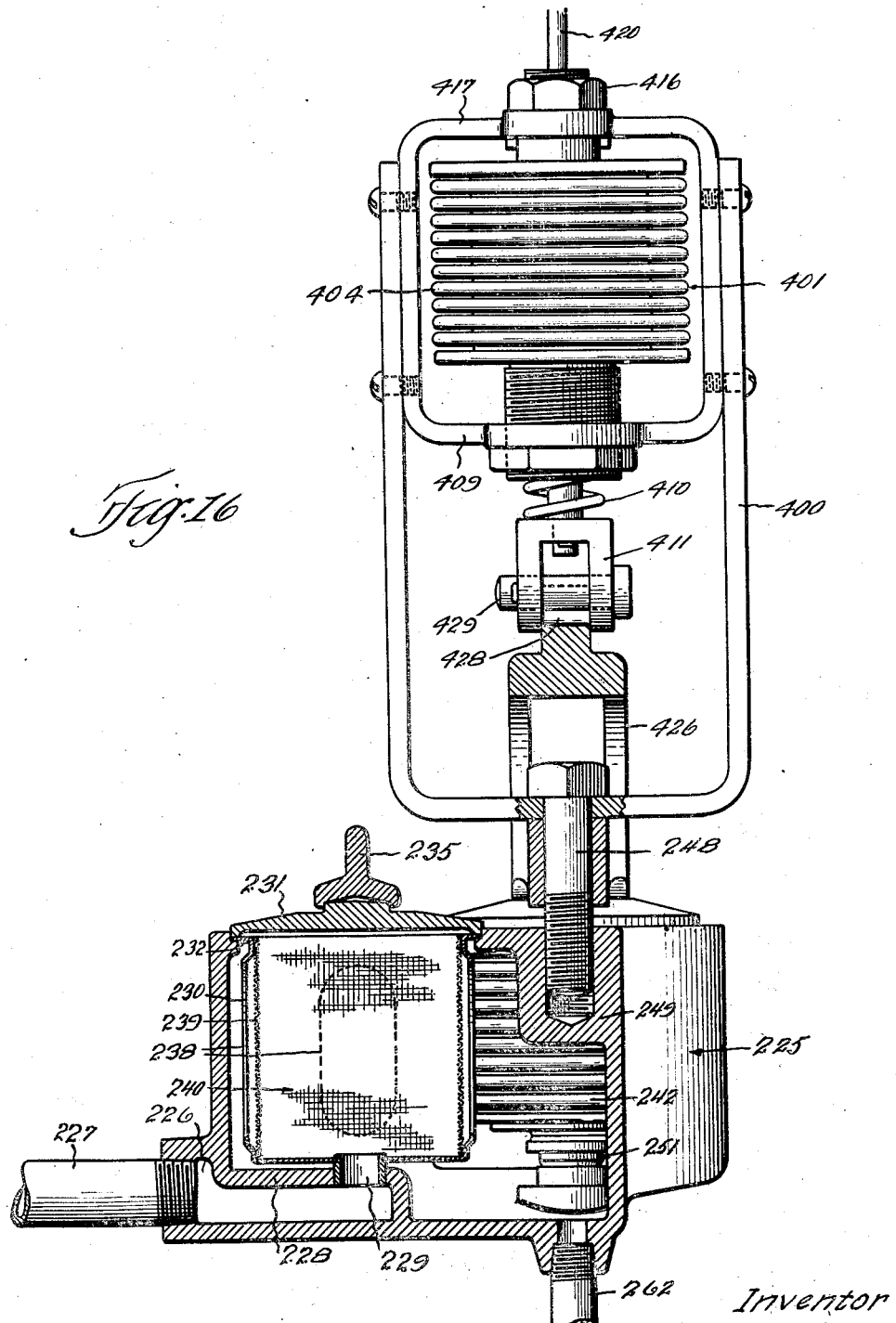

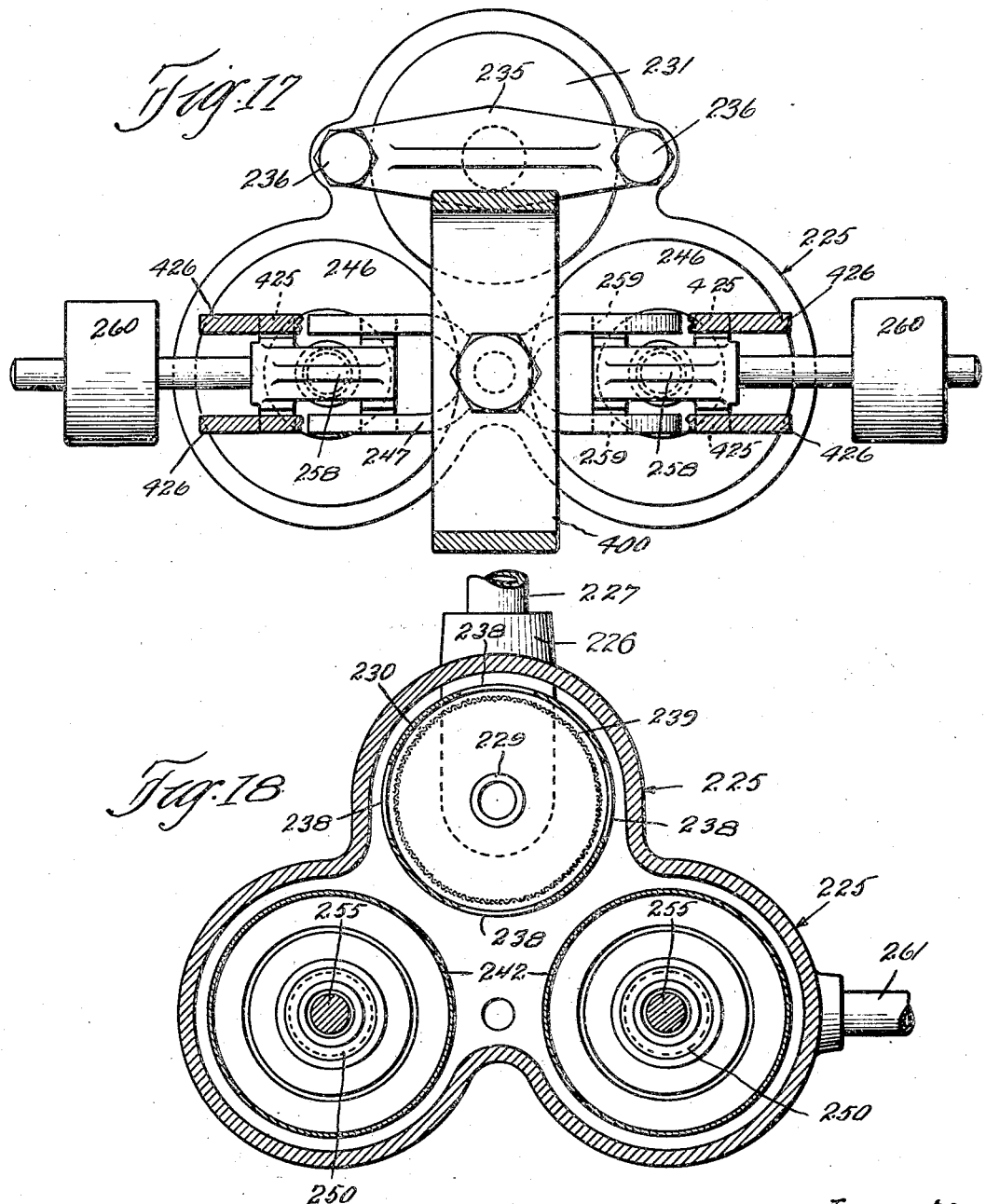

May 14, 1929.　　　　　M. RESEK　　　　　1,712,737
DUAL CONTROL HEATING SYSTEM
Filed Oct. 6, 1926　　　28 Sheets-Sheet 15
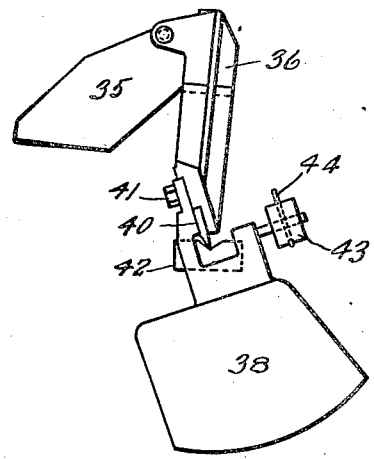
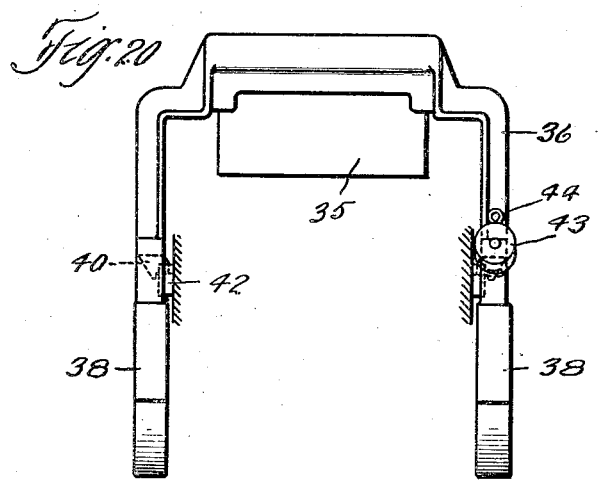
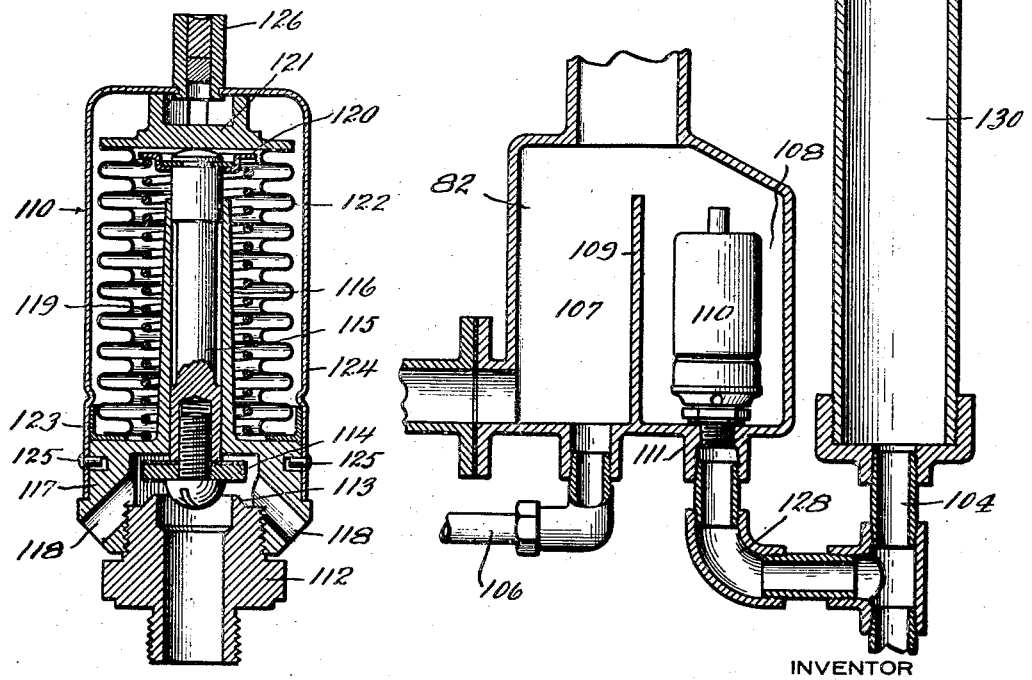
INVENTOR
Marc Resek
By Hull, Brock & West
Attys.

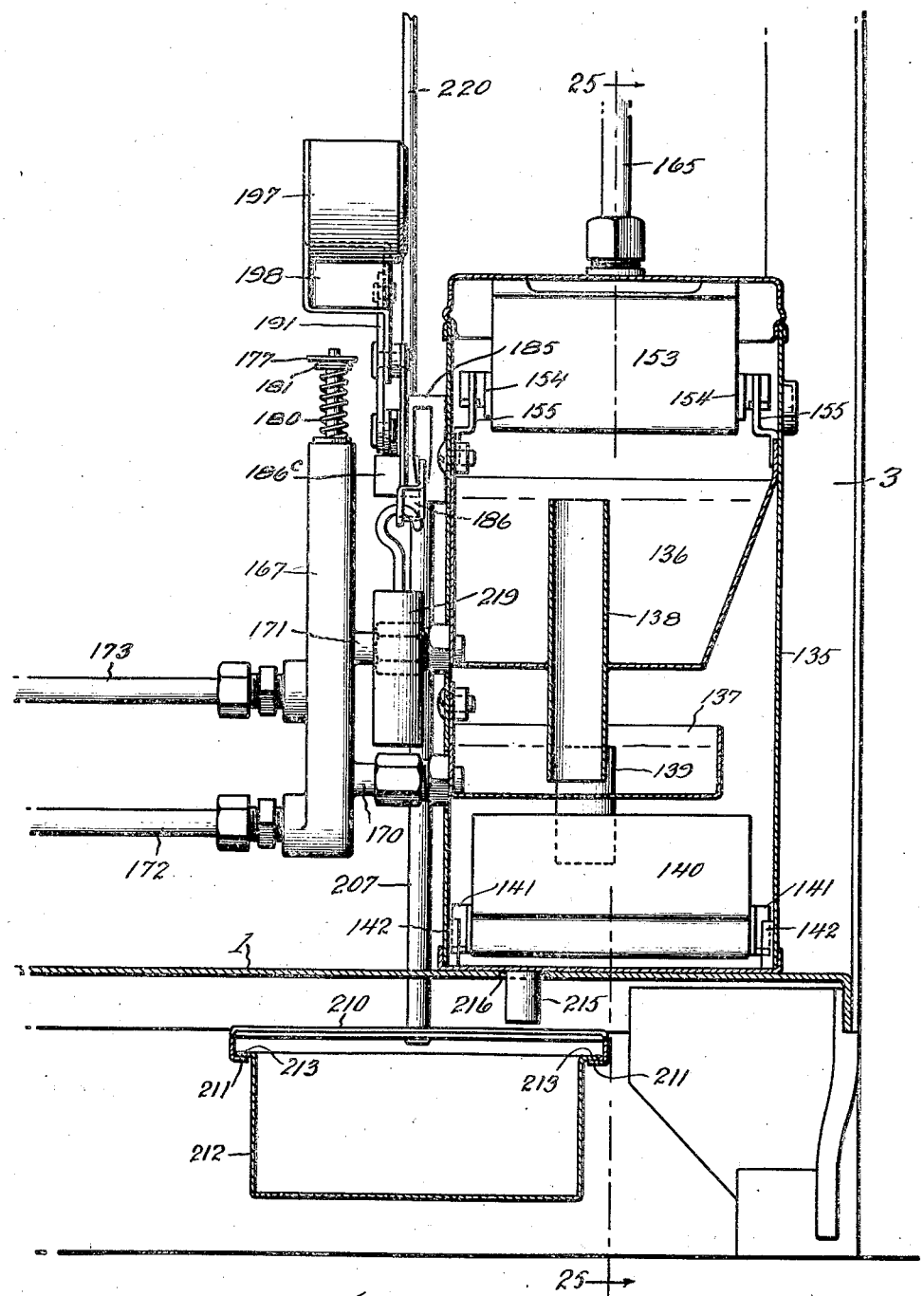

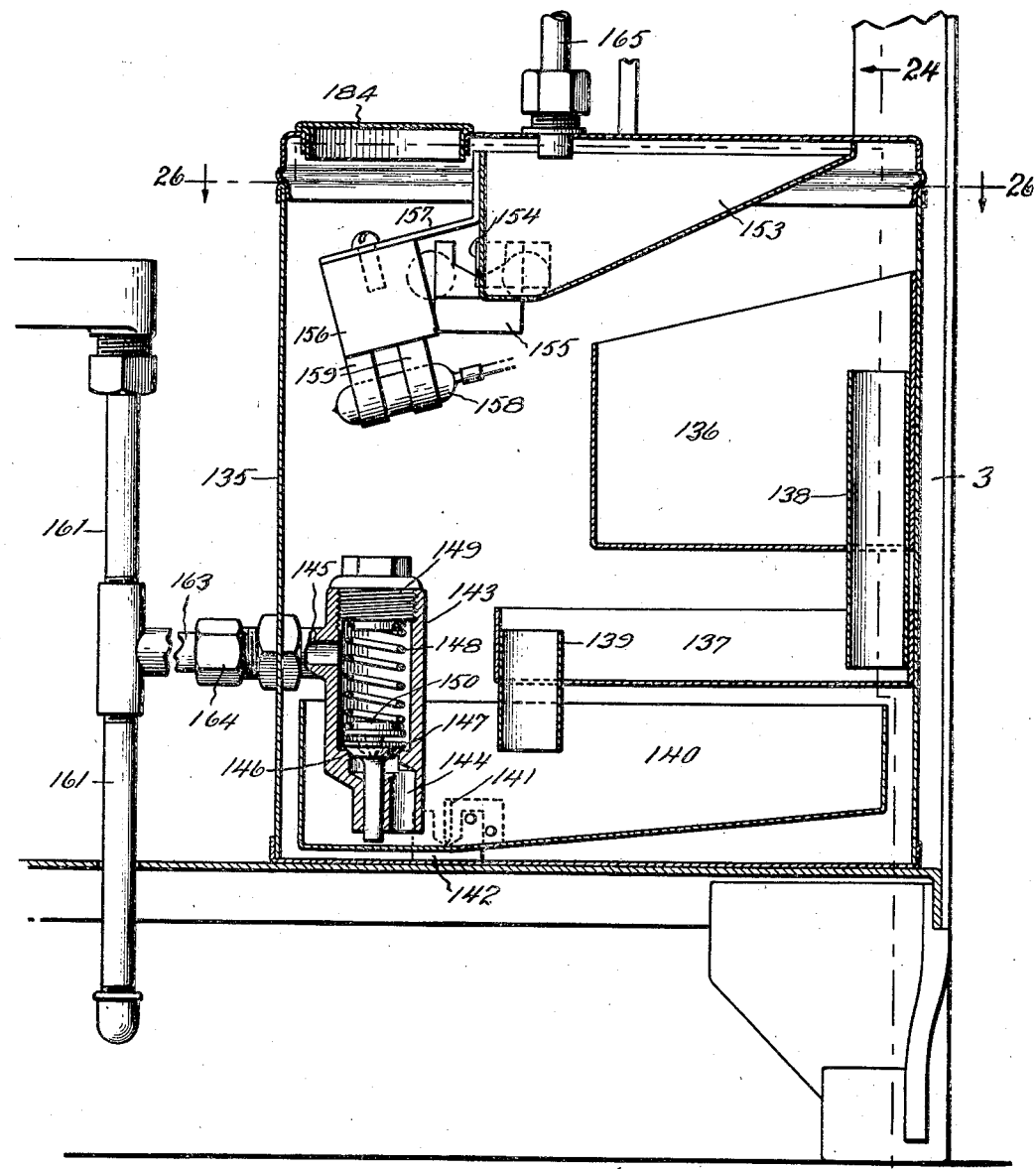

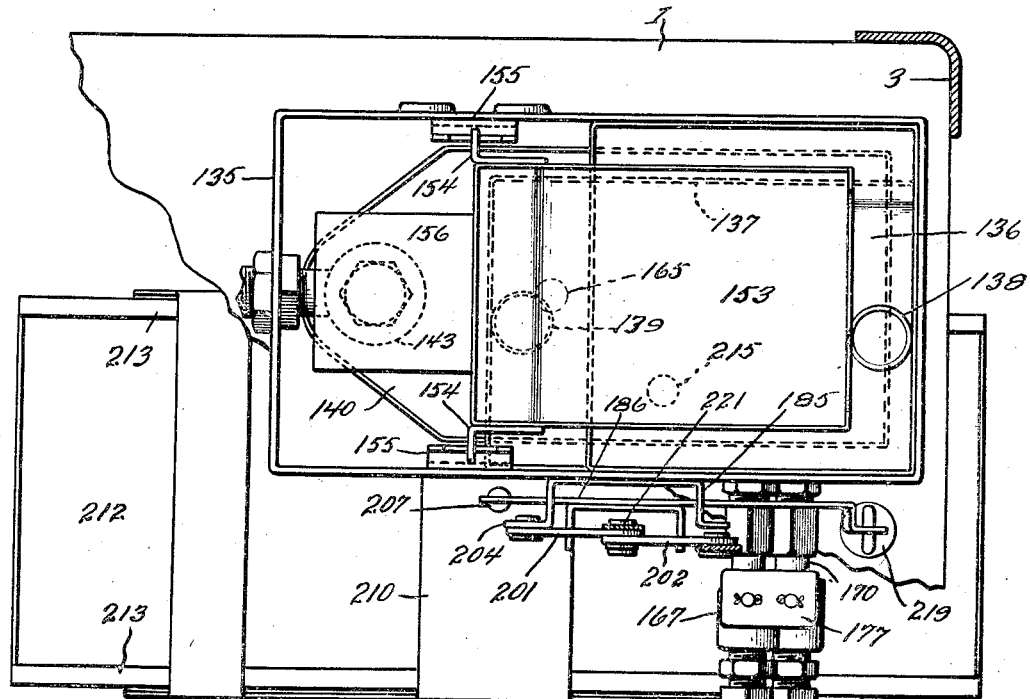
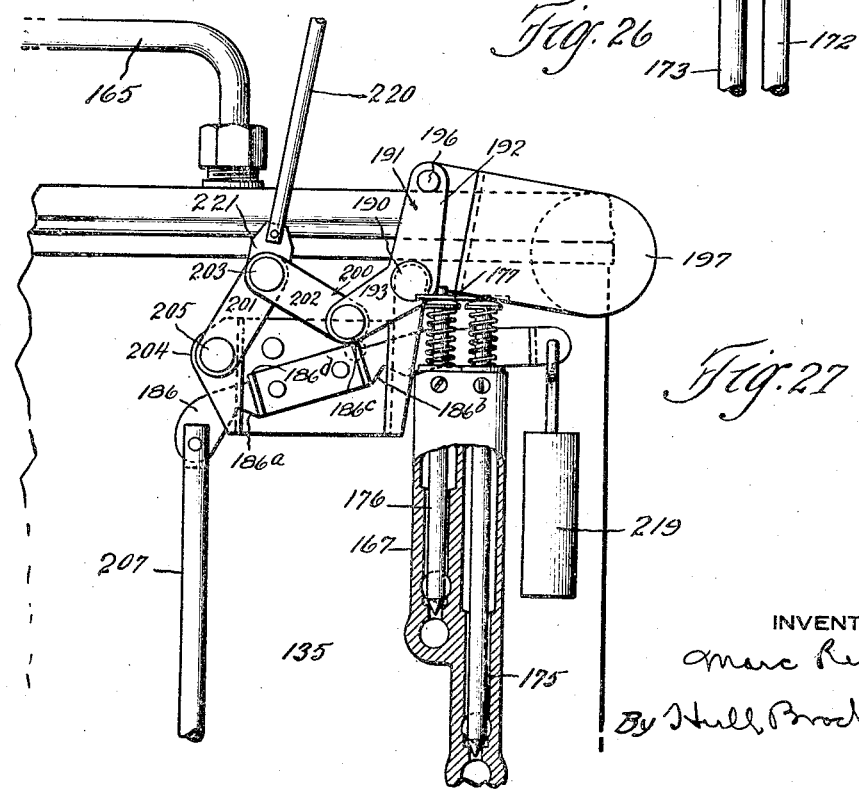

May 14, 1929.　　　　M. RESEK　　　　1,712,737
DUAL CONTROL HEATING SYSTEM
Filed Oct. 6, 1926　　　28 Sheets-Sheet 21

INVENTOR
Marc Resek
By Hull, Brock & West
Attys.

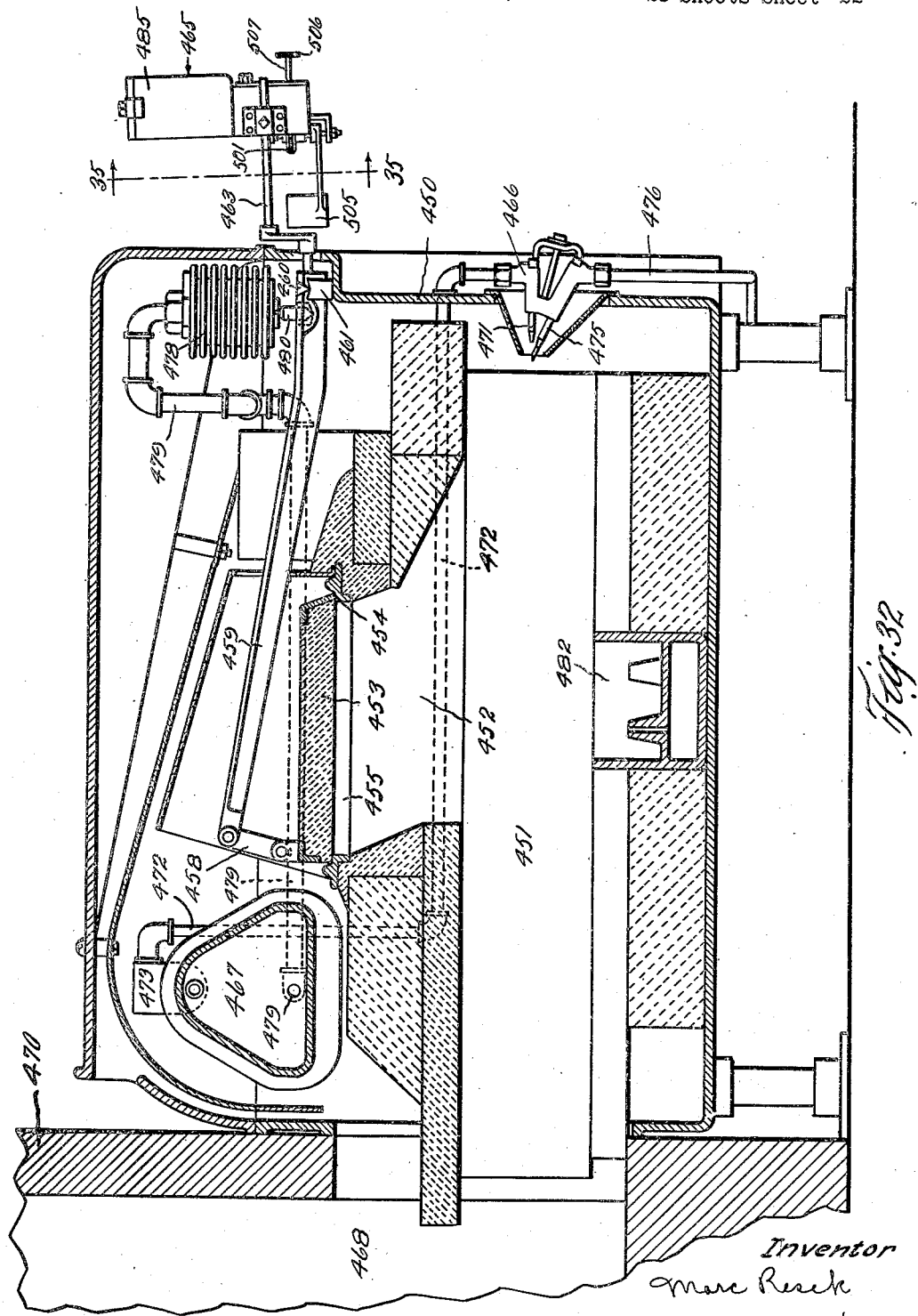

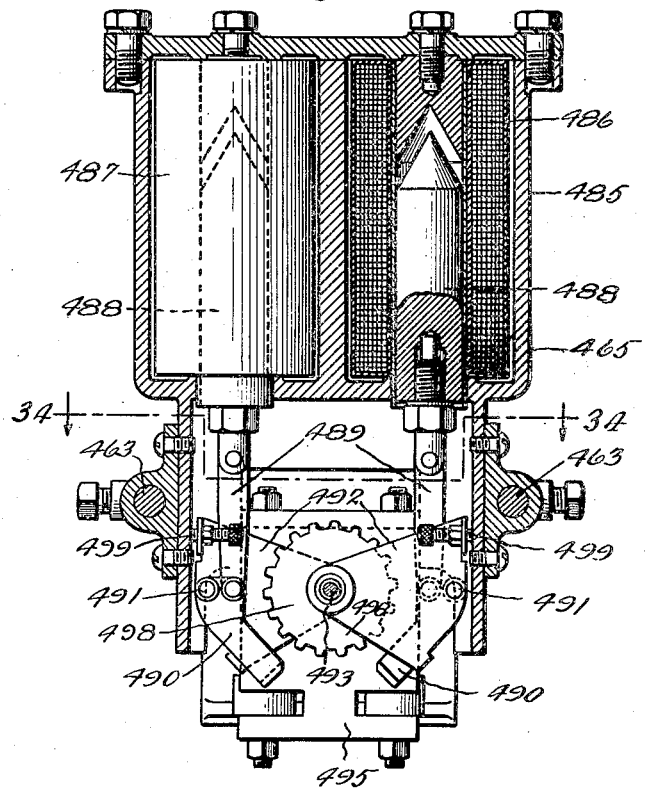
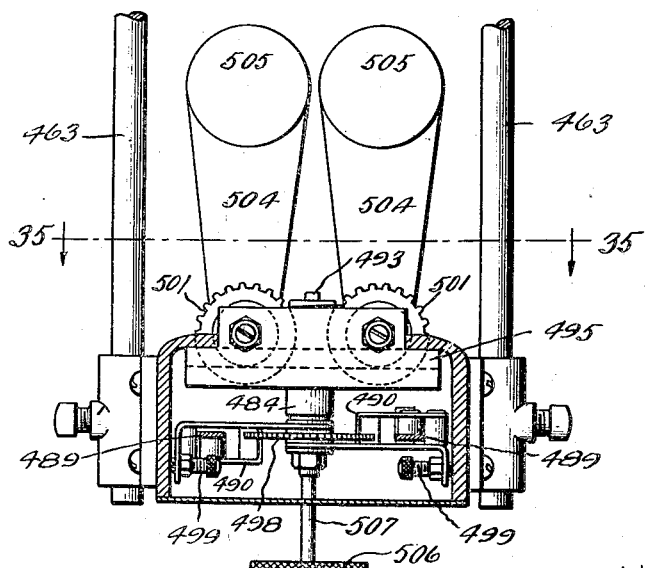

May 14, 1929. M. RESEK 1,712,737
DUAL CONTROL HEATING SYSTEM
Filed Oct. 6, 1926  28 Sheets-Sheet 24
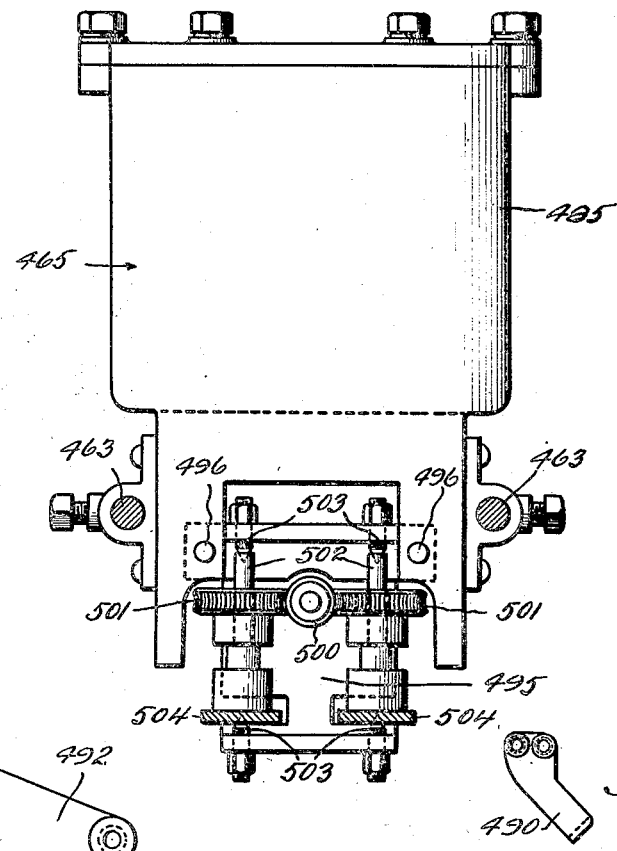
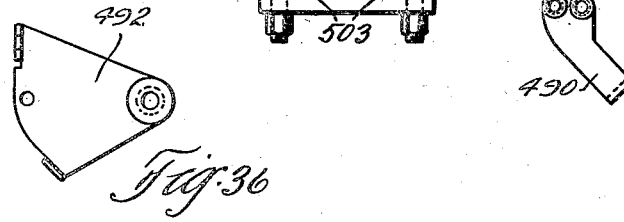
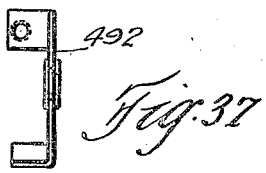
INVENTOR
Marc Resek
By Hull, Brock & West
Attys.

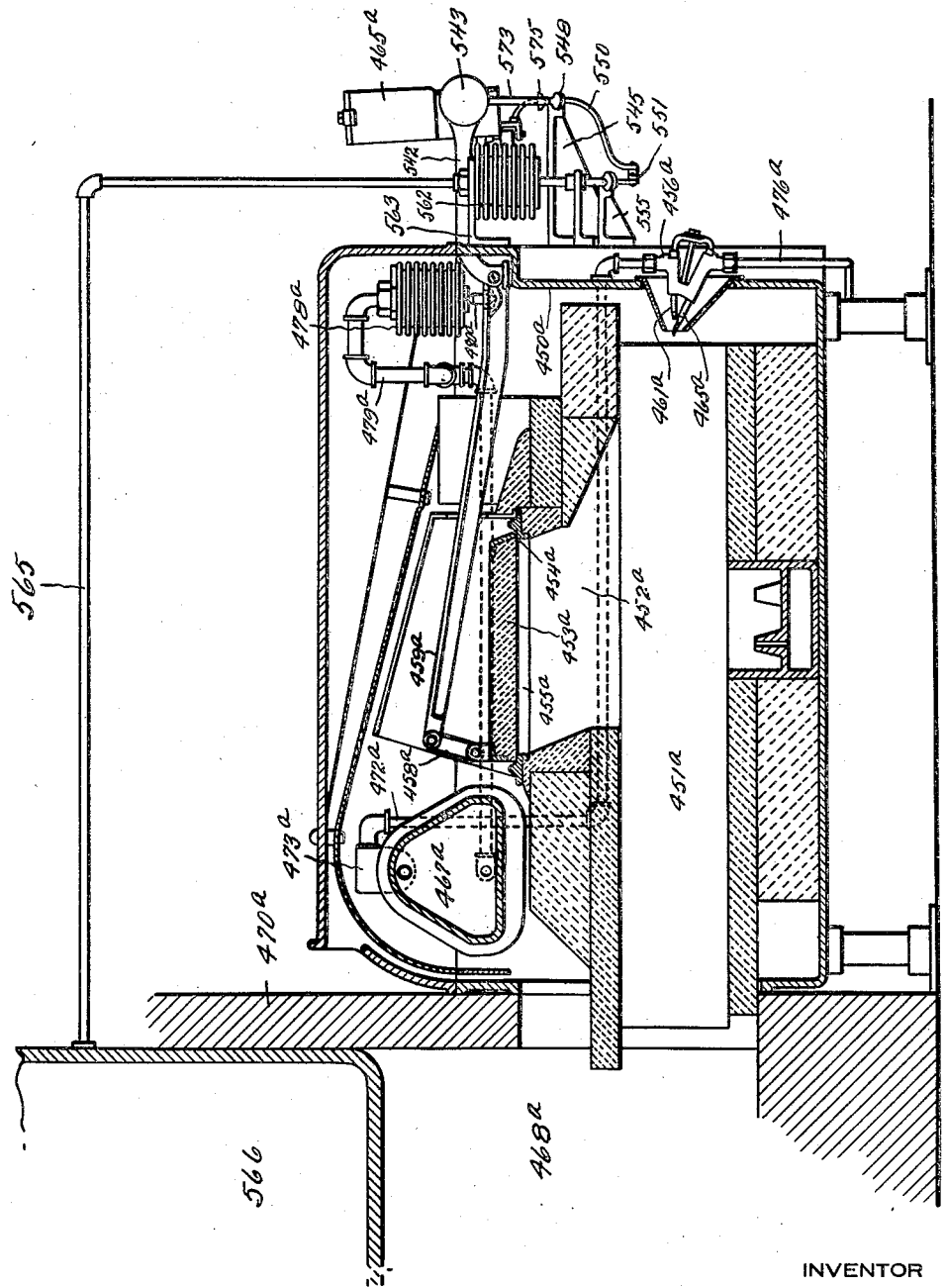

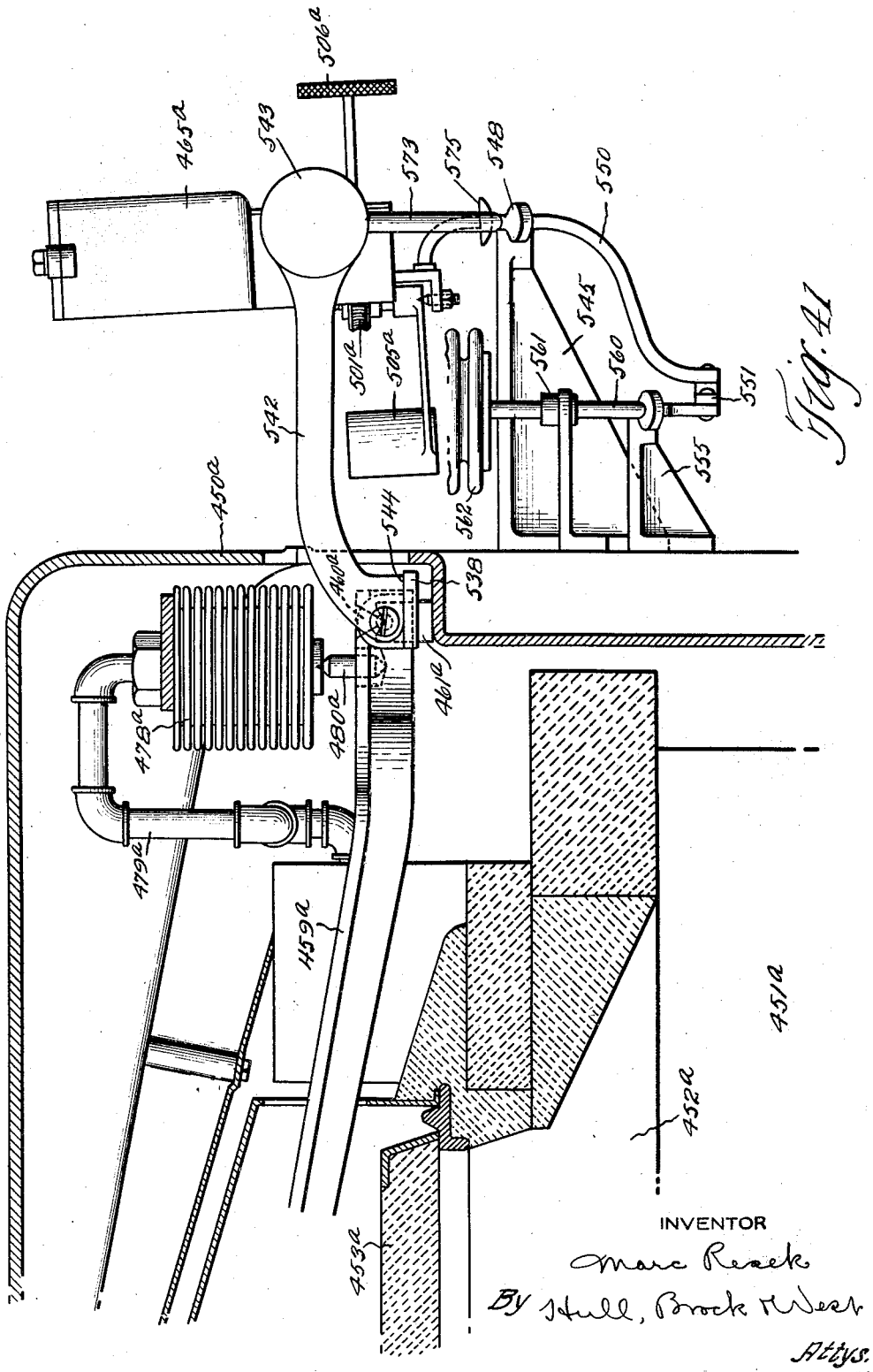

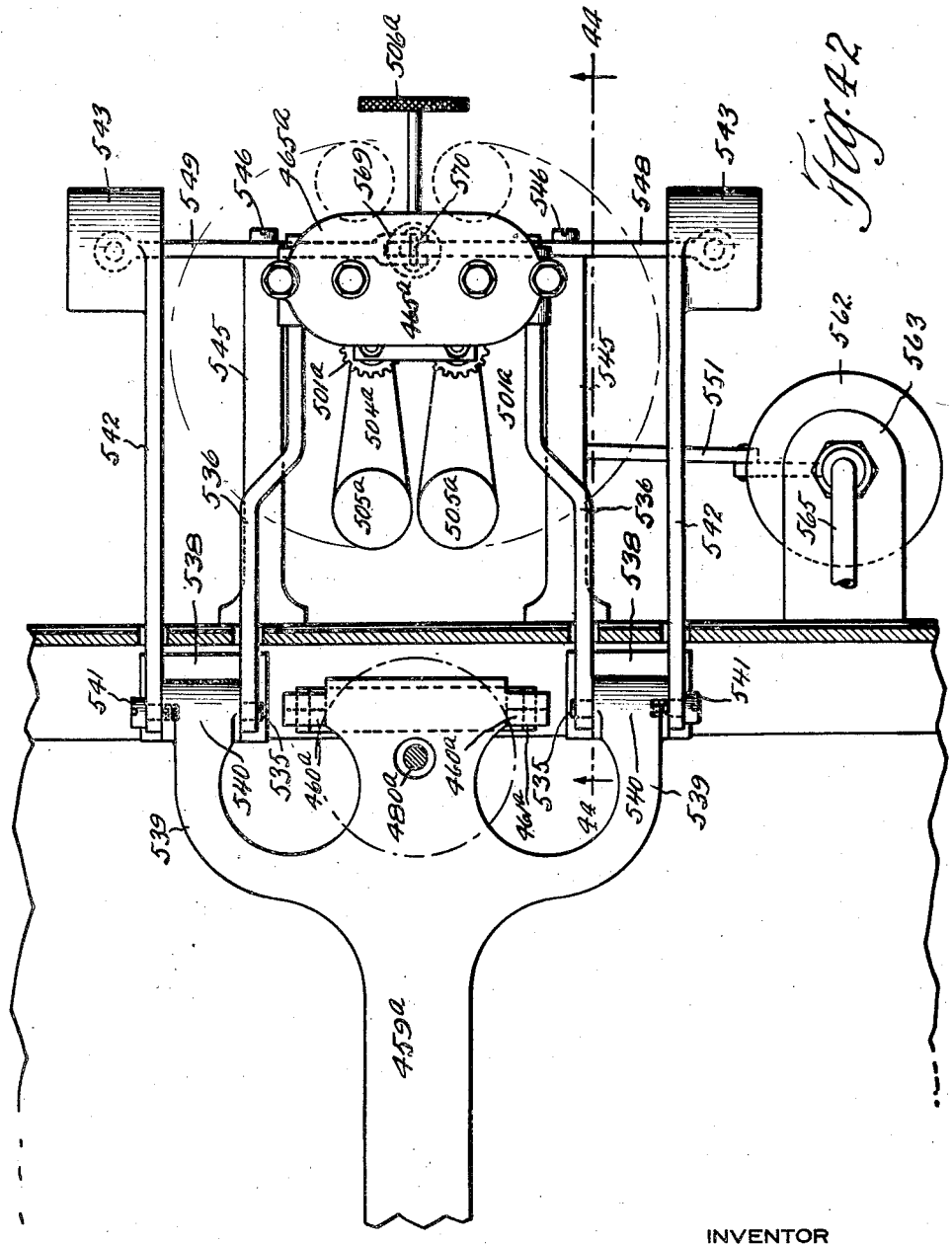

May 14, 1929.    M. RESEK    1,712,737
DUAL CONTROL HEATING SYSTEM
Filed Oct. 6, 1926    28 Sheets-Sheet 28

INVENTOR
Marc Resek
By Hull, Brock & West
Attys.

Patented May 14, 1929.

1,712,737

UNITED STATES PATENT OFFICE.

MARC RESEK, OF CLEVELAND HEIGHTS, OHIO, ASSIGNOR TO PERFECTION STOVE COMPANY, OF CLEVELAND, OHIO, A CORPORATION OF OHIO.

DUAL-CONTROL HEATING SYSTEM.

Application filed October 6, 1926. Serial No. 139,877.

This invention relates generally to that class of heating systems wherein the action of the heating device or apparatus is automatically controlled by two governing units—as two thermostats, or a thermostat and a pressurestat—one of said units, a thermostat (and referred to hereinafter as the room thermostat) being located within an enclosure, as a room, that is heated by the device or apparatus, and the other, a thermostat or a pressurestat, being situated within, or in juxtaposition to, the heating apparatus or furnace (and therefore referred to for clearness and convenience as a "furnacestat"). The latter acts to reduce the heat of the apparatus should the same become excessively high regardless of what the temperature in the room or enclosure is, and the former acts, only when the second mentioned unit is ineffective, to maintain the temperature of the room or enclosure substantially constant.

The invention has to do, also, with an improved oil burning apparatus.

The fundamental purpose of the invention is to improve systems of the character above referred to and render them safe and thoroughly reliable.

In the preferred embodiments of the system I employ fuel oil burners of the general character of those disclosed in the following co-pending applications: Serial No. 726,657, filed July 18, 1924, jointly by L. S. Chadwick, J. Alger Dahlstrom and myself; and Serial No. 24,052, filed April 18, 1925, solely by myself.

Other objects of the invention are to improve oil burners of the character referred to; to provide therefor convenient filling means, an efficient water feed, and water level control means for the steam generator; to provide efficient oil feeding and control means for the burner; to provide a safety appliance that will operate automatically to shut off the oil supply to the burner in case the normal oil circulation through the system is interrupted, or in case the apparatus becomes overheated, or that may be operated manually from a remote point; to provide improved magnetic control mechanism for burners of the character aforesaid; to incorporate in such mechanism, means for manually adjusting the mechanism, and an indicator to show the adjusted condition of the same; and to provide, in combination with a switch in the circuit of the magnetic control mechanism, means for intermittently operating the same by the oil flow.

Drawings.

The foregoing general objects, with many other and more specific ones that will appear as this description proceeds, are attained in embodiments of the invention illustrated in the accompanying drawings wherein Fig. 1 is a diagram of the present preferred embodiment of the system including a conventional representation of a furnace in front elevation with my improved oil burning apparatus associated therewith; Fig. 2 is a front elevation of the oil burning apparatus with the front wall of the casing removed; Figs. 3, 4 and 5 are vertical sections through the apparatus on the respective lines 3—3, 4—4 and 5—5 of Fig. 2, each view being taken as though looking in the direction indicated by the arrows associated with its respective section line; Figs. 6 and 7 are partial sections and front elevations, the plane of section in the respective views being indicated by the lines 6—6 and 7—7 of Fig. 4, the views being taken as though looking toward the rear of the apparatus, as indicated by the arrows associated in said lines; Fig. 8 is a sectional plan of the apparatus; Fig. 9 is an enlarged sectional detail of the damper control mechanism, the plane of section being parallel to the plane of Fig. 5; Fig. 10 is a plan view of said mechanism; Fig. 11 is a transverse section through the mechanism substantially on the line 11—11 of Fig. 10; Fig. 12 is a perspective view of the parts of a double knife edge bearing included in said mechanism, the parts being in separated condition; Fig. 13 is a vertical section through the magnetic control means of said mechanism, the plane of section being indicated by the lines 13—13 of Figs. 9 and 10; Fig. 14 is a section substantially on the line 14—14 of Fig. 13, Fig. 15 is an enlarged sectional front elevation of the steam operated control valves of the auxiliary burners and of the automatic shut-off device for said valves which is actuated by the furnacestat; Fig. 16 is a central vertical section through said valves and said device at right angles to the plane of section of Fig. 15; Figs. 17 and 18 are horizontal sections on the respective lines 17—17 and 18—18 of Fig. 15; Figs. 19 and 20 are, respectively, a side elevation and a front elevation of the damper unit; Fig. 21 is a vertical section through the water chamber from which the steam generated is fed and includes the filling column and the thermostatic control for the outlet valve of the chamber; Fig. 22 is a vertical section through said thermostatic control and valve; Fig. 23 is a left hand side elevation of the oil reservoir and the safety appliance associated therewith; Fig. 24 is a vertical section substantially on the lines 24—24 of Figs. 23 and 25; Fig. 25 is a vertical section substantially on the line 25—25 of Fig. 24; Fig. 26 is a horizontal section substantially on the line 26—26 of Fig. 25; Fig. 27 is a fragmentary view, similar to Fig. 23, showing the safety appliance in condition to effect a closing of the valves which control the supply of oil to the main and auxiliary burners; Figs. 28 and 29 (Sheet 18) are perspective views of the supporting bracket and operating lever, respectively, of the safety appliance; Fig. 30 is a wiring diagram of the circuit through which the magnetic means of the damper control mechanism is governed by the room thermostat; Fig. 31 is a diagram of a modification of the system; Fig. 32 is a sectional side elevation of the oil burning apparatus employed in the present modification; Fig. 33 is a vertical section through the magnetic means of the damper control mechanism used in the apparatus of Fig. 32; Fig. 34 is a horizontal section substantially on the line 34—34 of Fig. 33; Fig. 35 is a sectional elevation on the lines 35—35 of Figs. 32 and 34; Figs. 36 and 37 are views, at right angles to each other, of one of the pawl carrying members included in the mechanism illustrated in the immediately previous views; Fig. 38 is a face view and Fig. 39 a plan view of a pawl carried by the pawl carrying member shown in Figs. 36 and 37; Fig. 40 is a central vertical section through an oil burning apparatus embodying a further modification of the invention; Fig. 41 is an enlargement of the upper right hand corner of Fig. 40; Fig. 42 is a fragmentary section through the apparatus shown in Figs. 40 and 41 and discloses particularly the damper control mechanism; Fig. 43 shows said damper control mechanism in front elevation; and Fig. 44 is a section on the line 44—44 of Fig. 42.

*General description.*

Preliminary to a detailed description of the invention I shall relate briefly the general character and mode of operation of the present preferred embodiment illustrated in Figs. 1 to 30.

The oil burning apparatus—of a size and design adapting it to be conveniently located in front of a furnace in a position to discharge its products into the fire box through the ash pit door—incorporates a steam generator and, preferably, a steam superheater; a water chamber in communication with the generator, the same having an overflow which determines the maximum water level in the generator; means, preferably thermostatic, which controls the outlet valve of said chamber, a water supply which is preferably maintained at a substantially constant level as by suitable float mechanism; a water pump for circulating water through the chamber and which, as the water supply therein is depleted, draws additional water from the water supply; a main and one or more auxiliary burners of the injector type arranged in operative relation to the generator and superheater and to which steam is supplied from the generator or superheater; an oil reservoir including oil chambers, one for supplying oil to the main burner and one for supplying oil to each of the auxiliary burners; an oil supply; a pump for circulating oil through the chambers of the reservoir, and means for automatically cutting in the oil supply to replenish that drawn from the chambers; steam operated means which receives its steam supply from the generator for operating the water and oil pumps and which is preferably a single unit common to both pumps; a damper for controlling the proportion of heat that is delivered from the main and auxiliary burner flames to the generator and superheater; a weight, variable in its influence, that tends to open the damper; a steam actuated device, subjected to the steam pressure in the generator, opposing said weight; electrically energized means for increasing and decreasing the influence of the weight on the damper; a circuit including said means; the so-called room thermostat for controlling the circuit thereby to vary the effect of the weight as aforesaid; an intermittent circuit closer in said circuit that is preferably operated by the flow of oil through the oil circulating system; steam pressure controlled means subjected to the steam pressure in the generator, for throwing the auxiliary burner or burners into and out of operation; a furnacestat, subjected to the temperature of the furnace, or to the temperature of water or the pressure of steam in the boiler of a hot water or steam furnace, for shutting off the auxiliary burner or burners when the temperature or pressure exceeds a predetermined value; a safety appliance, operated by an overflow of oil from the reservoir resulting from a stoppage in the oil circulating system, or by the fusing of a retaining element resulting from an abnormally high temperature of the apparatus, or which may be manually operated from a remote point, for shutting off the oil supply to the main and auxiliary burners; and means preventing the resetting of the safety appliance unless the oil receiver of said appliance is in place.

Other features of importance but of a less general nature will be introduced during the detailed description.

With the generator supplied with water in a manner which will presently be explained, and oil present in the oil circulating system, the operation of the apparatus is started by the application of heat to the generator, as by means of a suitable preheating burner. As soon as steam is created in the generator it is communicated to the main burner and injects into the combustion chamber, in proper proportion to the quantity of steam issuing from the burner, oil drawn from the main burner compartment of the oil reservoir. This mixture is ignited, as by the flame of the preheating burner, and the major part of the products of combustion from the main burner passes directly into the fire box of the furnace while a portion thereof is deflected in heating relation to the generator and the steam superheater, such portion ultimately finding its way to the furnace. The steam pressure in the generator is communicated to the damper control mechanism and tends to move the damper toward generator shielding position, which action is opposed by the variable weight. The circuit which supplies current to the electrically energized means for varying the effect of the weight upon the damper is intermittently closed by the circuit closer which is actuated by the flow of oil through the oil circulating system. However, the room thermostat incorporates a switch which is also in said circuit, and the latter switch determines whether the influence of the weight on the damper is increased or decreased. Accordingly, when the room temperature rises above a predetermined value, the weight is so affected as to require a lesser pressure in the generator to balance the influence of the weight, thus allowing a lesser amount of heat to pass the damper and reach the generator to produce the necessary steam pressure and consequential output of heat by the apparatus to meet the prevailing temperature conditions, it being understood that the steam pressure in the generator determines the amount of heat delivered by the apparatus; i. e. the lower the steam pressure, the less the volume of heat. Reversely, when the room temperature falls below a predetermined value, the weight is so affected as to require a greater pressure in the generator to balance the influence of the weight, wherefore more heat passes the damper, a greater steam pressure is created in the generator, and the output of heat by the apparatus is increased to meet the new conditions.

In case the temperature of the room falls to such an extent that the main burner, operating to its full capacity, is insufficient to meet the requirements, then one or both of the auxiliary burners is or are thrown into operation.

In case the temperature of the apparatus becomes excessively high under the action of the auxiliary burners, and notwithstanding what the temperature affecting the room thermostat may be, the furnacestat acts to shut off the auxiliary burners.

The manner in which the water is circulated through the chamber which supplies water to the generator and maintains it at a substantially constant level therein; how the oil is circulated through the system; and how the safety appliance functions along with other phases of the operation of the apparatus, will be fully described hereinafter.

Detailed description.

Figure 1:
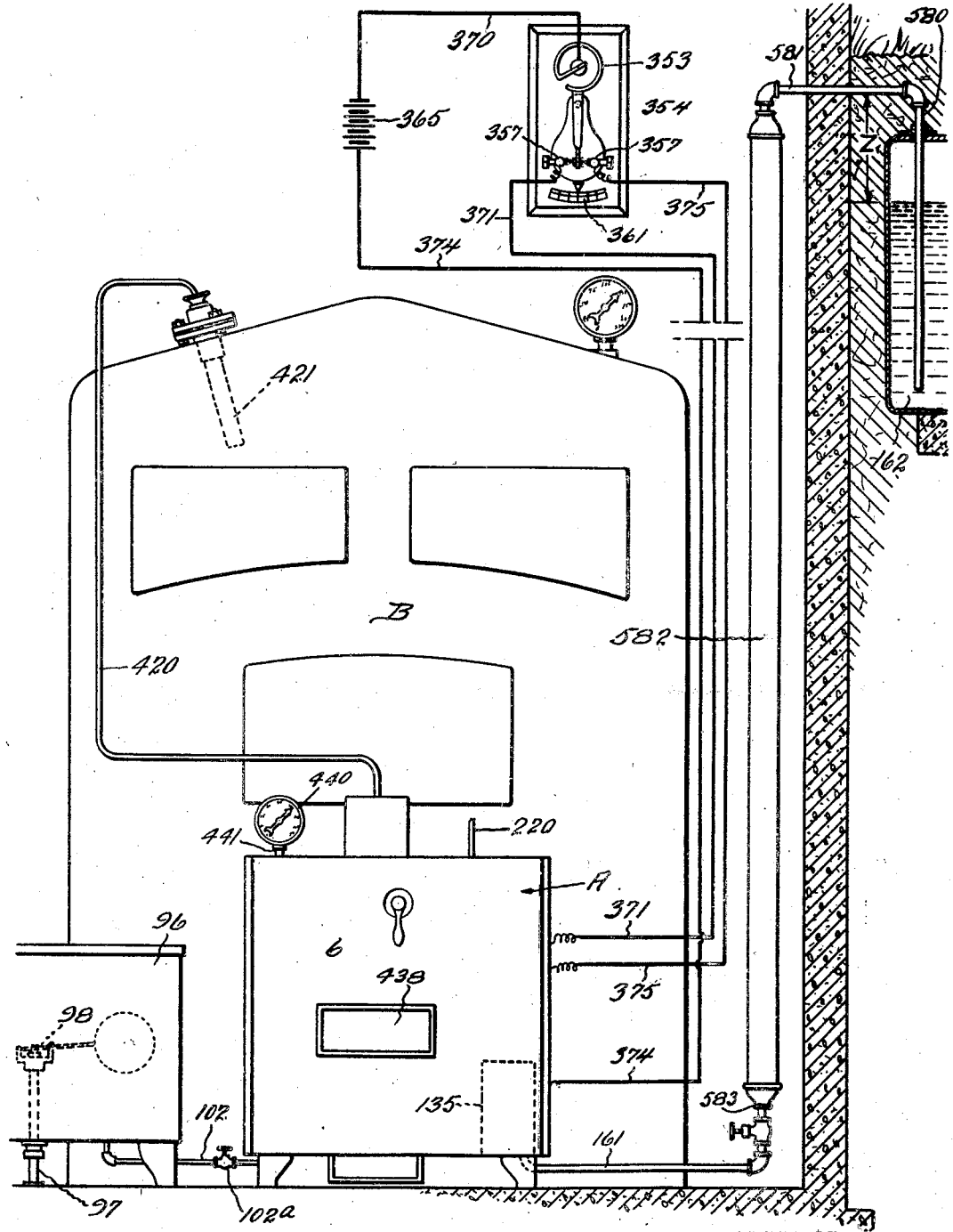
Figure 2:
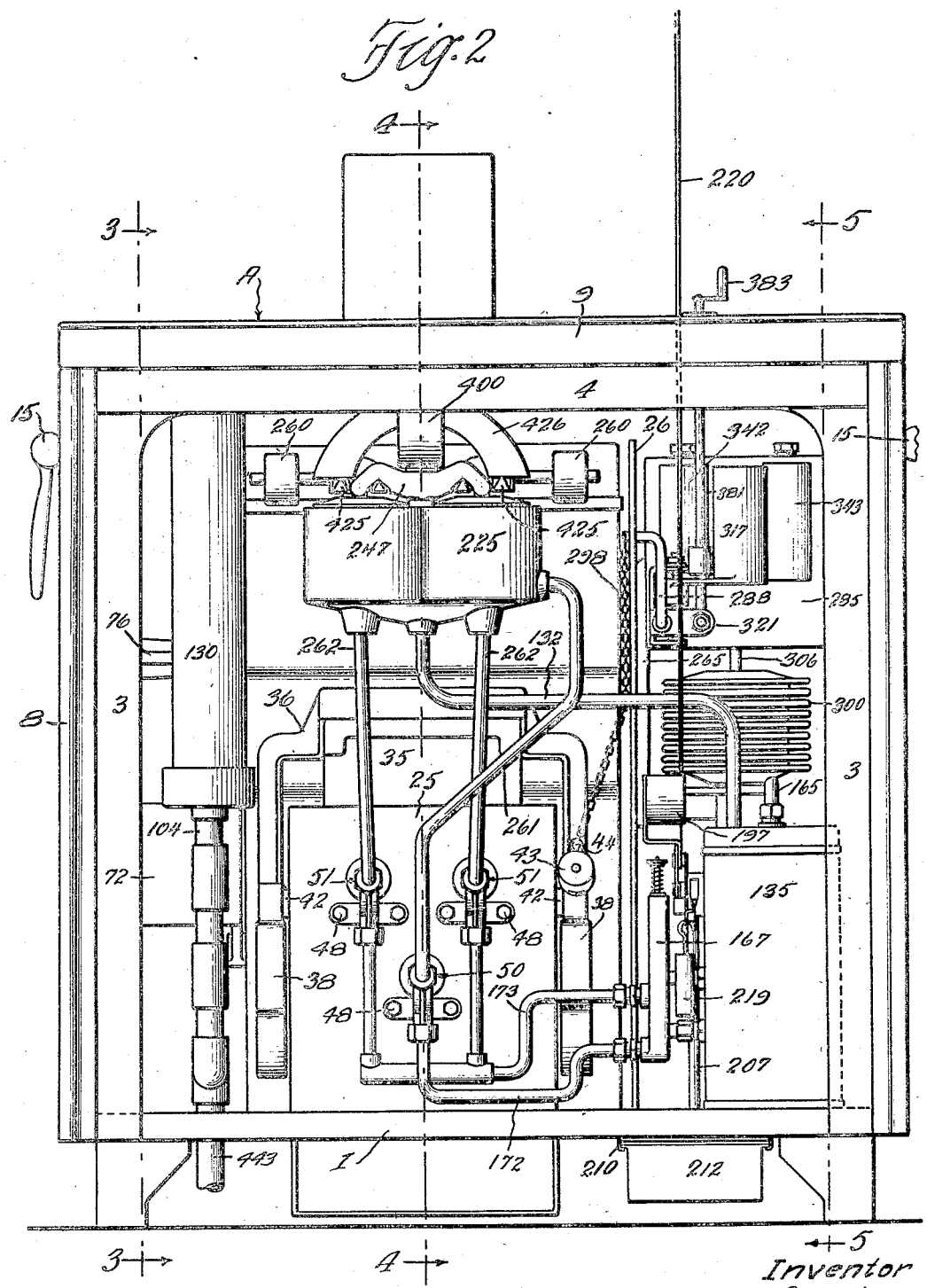

Turning now to a detailed description of the invention by the use of reference characters, and considering first the form above described in brief, A designates the oil burning apparatus generally, and B, the furnace.

Frame and casing.

(Reference numerals 1 to 27.)

A base 1, that is preferably formed from a metal plate that is flanged downwardly about its periphery, is supported a suitable distance above the floor by legs 2. The base is rectangular in plan and rising from each corner of the base is a post 3 of angle formation, as shown in Fig. 8, and the tops of the posts are connected together by angle bars 4. A substantial frame is thus provided to which are applied the walls of a casing that encloses the operating parts of the oil burning apparatus. The rear wall 5 is shown as constructed of a single plate, while the front wall 6, respective right and left hand side walls 7 and 8, and the top wall 9, are insulated walls comprised of sheet metal shells that are filled with suitable non-heat conducting material. The front, side and top walls are preferably detachably connected to the frame, and as a convenient means of accomplishing this end, the front and side walls are provided, near their lower edges, with inwardly and downwardly extending tongues 12, the lower ends of which are reduced in size to fit within apertures in the base 1. Near their upper edges the front and side walls are equipped with buttons 14 for engagement with the angle bars 4, the same being adapted to be manipulated by handles 15 that are disposed on the outer sides of the walls and are suitably connected to the buttons. The top wall 9 rests upon the angle bars 4 and at its forward edge has a lip 16 which occupies a rabbetted portion of the front wall 6.

Rising from the base 1, about midway between the side walls 7, 8 and near the back wall 5 is a housing A' comprised of a front wall 20, rear wall 21, right and left hand side walls 22 and 23, respectively, and a lagged top wall or cover 24. This housing contains the combustion chamber, the steam generator and the steam superheater, as will hereinafter more fully appear.

Figure 4:
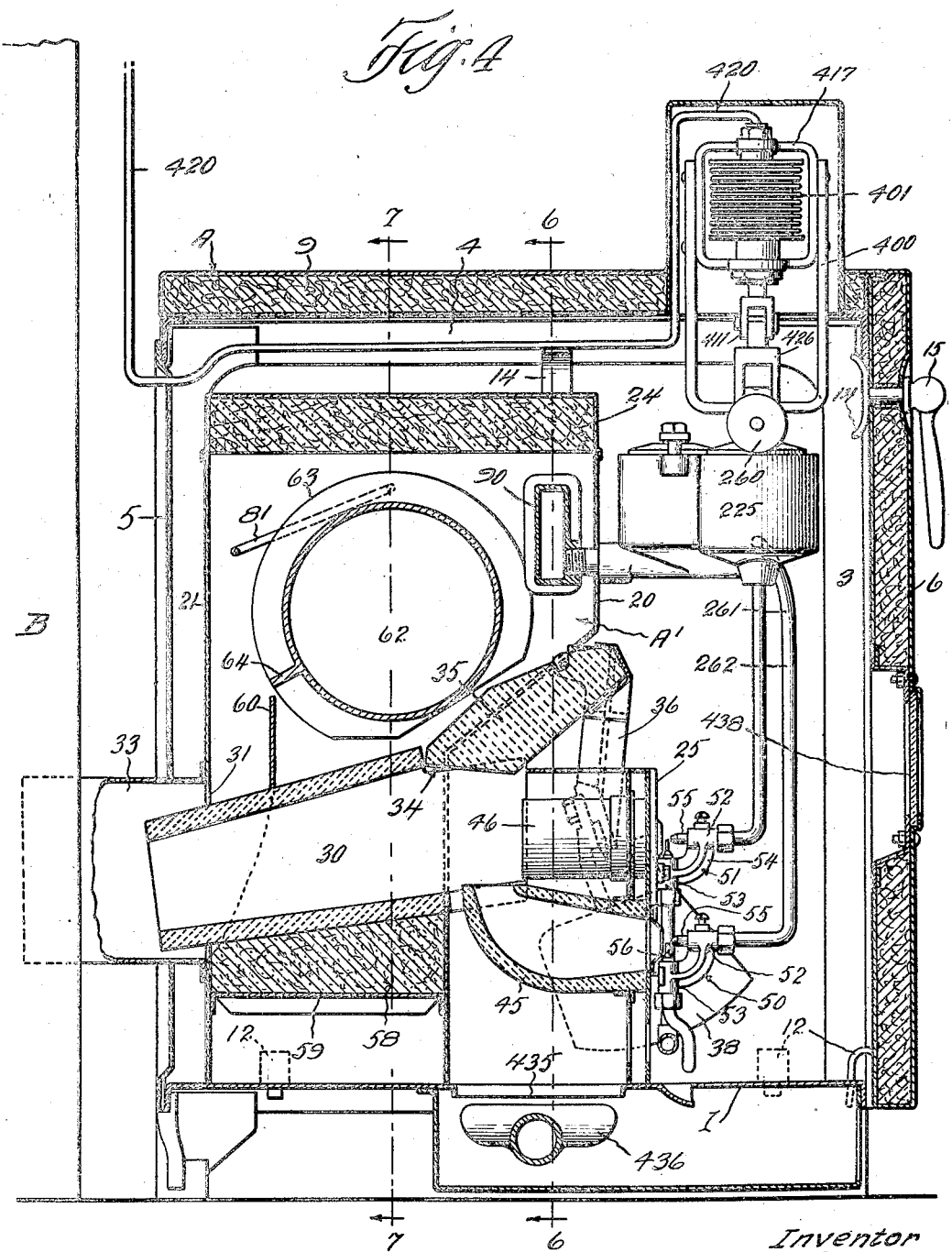

As will be seen by reference to Fig. 4, the lower portion of the front wall 20 is inset a material distance from the plane of its upper portion, and forwardly of the inset portion of said wall is disposed a supporting structure 25 that carries the main and auxiliary burners.

A plate 26 rises from the base 1 adjacent the right hand wall 22 of the housing A' and may be secured thereto and spaced therefrom by suitable means, as indicated at 27, so as to impart rigidity to said plate.

Oil burning and steam generating equipment.

(Reference numerals 30 to 95.)

Figure 7:
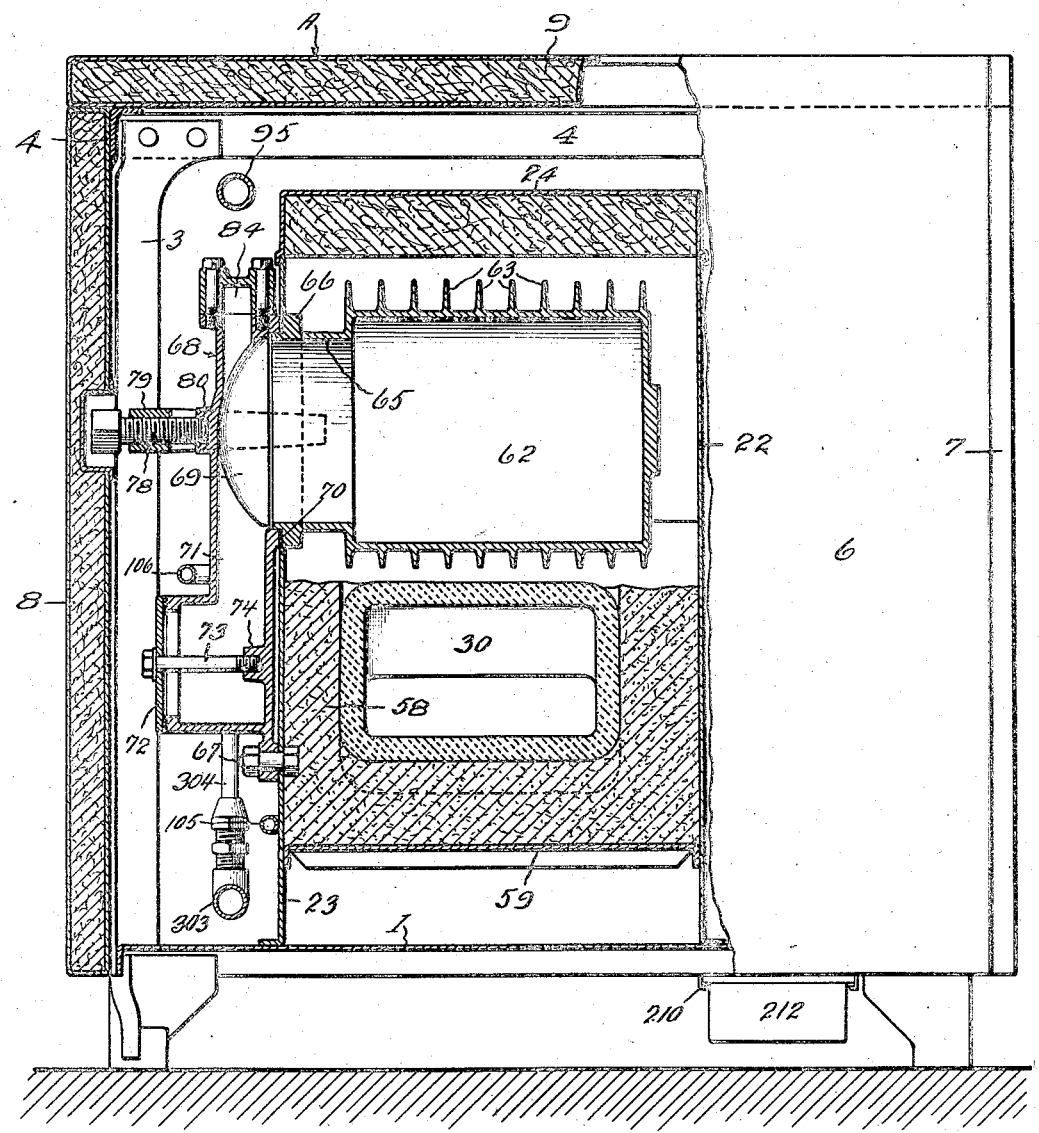

The combustion chamber of the apparatus is designated 30 and it is preferably in the nature of a tubular body of suitable refractory material having a rectangular cross section, as shown in Fig. 7. This combustion chamber is supported within the lower portion of the housing A' between the front and rear walls 20 and 21, said walls having openings for the accommodation of the respective ends of the housing, the opening in the rear wall extending somewhat above the combustion chamber to provide a passage 31, which, with the combustion chamber, opens into a duct 33 that is applied to the wall 21 and projects through an opening in the rear wall 5 of the casing. The opening in the front wall 20 through which the corresponding end of the combustion chamber projects extends a material distance above said chamber to provide a passage 34 that is adapted to be closed by a damper 35. This damper is preferably in the nature of a body of suitable refractory material that is supported within a yoke 36 (see Figs. 19 and 20). The yoke 36 is preferably built up of metal parts, and the lower ends of the side branches of said yoke terminate in weights 38. Knife edge bearings 40 are suitably set within the branches of the yoke, said branches being constructed of separable parts that are connected together by screws 41. The knife edge bearings 40 rest within V-notches in bearings 42 that are carried by the sides of the supporting structure 25. The weights 38 balance the damper unit on its knife edge bearings and an extra weight 43, applied to the forward side of the right hand branch of the damper unit in the approximate plane of its knife edge bearings, tends to rock the unit in a direction to withdraw the damper from the passage 34. A connection 44, in the form of an eye, is carried by the weight 43 for a purpose that will presently appear.

Supported by the structure 25 in operative relation to the combustion chamber 30 are main and auxiliary burner tubes 45 and 46, preferably constructed of refractory material such as that used for the combustion chamber. The burner tube 45 is directed inwardly and upwardly, while the burner tubes 46 extend directly inwardly.

Attached as by fastening means or bolts 48 to the front wall of the supporting structure 25 are the main burner 50 and the auxiliary burners 51. These burners are identical with one another in construction and are of the injector type, each consisting of angularly disposed tubular bosses 52 and 53 that are connected by a curved neck 54 and through which are fitted, respectively, a steam nozzle 55, and an oil jet 56.

As best shown in Figs. 4 and 7, the combustion chamber 30 is embedded in suitable heat insulating material 58 that is supported by a plate 59 disposed between the front, rear and side walls of the housing A'. A partition 60 extends between the side walls 22 and 23 of the housing above the combustion chamber a suitable distance forwardly of the rear wall 21 so as to baffle a direct passage of the products of combustion from the opening 34 to the opening 31.

Occupying the portion of the housing above the combustion chamber 30 is a steam generator or boiler 62 that is shown as provided with circumferential heat abstracting vanes 63, and a longitudinal rib 64 which is disposed adjacent the partition 60 and serves the same purpose as said partition. The generator or boiler 62 terminates at its left hand end in a neck 65 that is surrounded by a lip 66 that is inset slightly from the outer end of the neck. The left hand wall 23 of the housing is provided with a circular opening for the accommodation of the lip 66 and secured to the outer side of said wall, as by bolts 67, is a unit 68 which includes a circular part that constitutes the head of the boiler or generator and is designated 69. This head has a circular opening which receives the extremity of the neck 65 and a gasket 70 is adapted to be clamped between the lip 66 and an opposed portion of the head 69. A hollow leg 71 depends from the head 69 and has an opening adjacent its lower end that is adapted to be closed by a cover 72 that is clamped against a portion of the leg surrounding said opening by a screw 73 that passes through the cover 72 and is threaded into a boss 74 on the inner wall of the leg 71. Gaskets of suitable material are employed wherever needed to effect sealed joints between parts of the structure, in accordance with common practice.

The generator or boiler 62 is clamped to the head 69 by a yoke 76 which has the hooked ends of its branches extending through openings in the wall 23 and engaged with the lip 66, as clearly shown in Fig. 8. A screw 78 is threaded through a central boss 79 of the yoke 76 and bears at its inner end within a recess 80 of the head 69. By this simple means the generator may be effectively clamped with a leak proof joint to the head 69 and, when it is desired to remove the generator for any purpose, as for cleaning, it is only necessary to retract the screw 78 sufficiently to allow the yoke 76 to be extended inwardly far enough to permit the withdrawal of the neck of the generator from the opening in the head, the generator being equipped with a bail 81 to facilitate handling.

Figure 6:
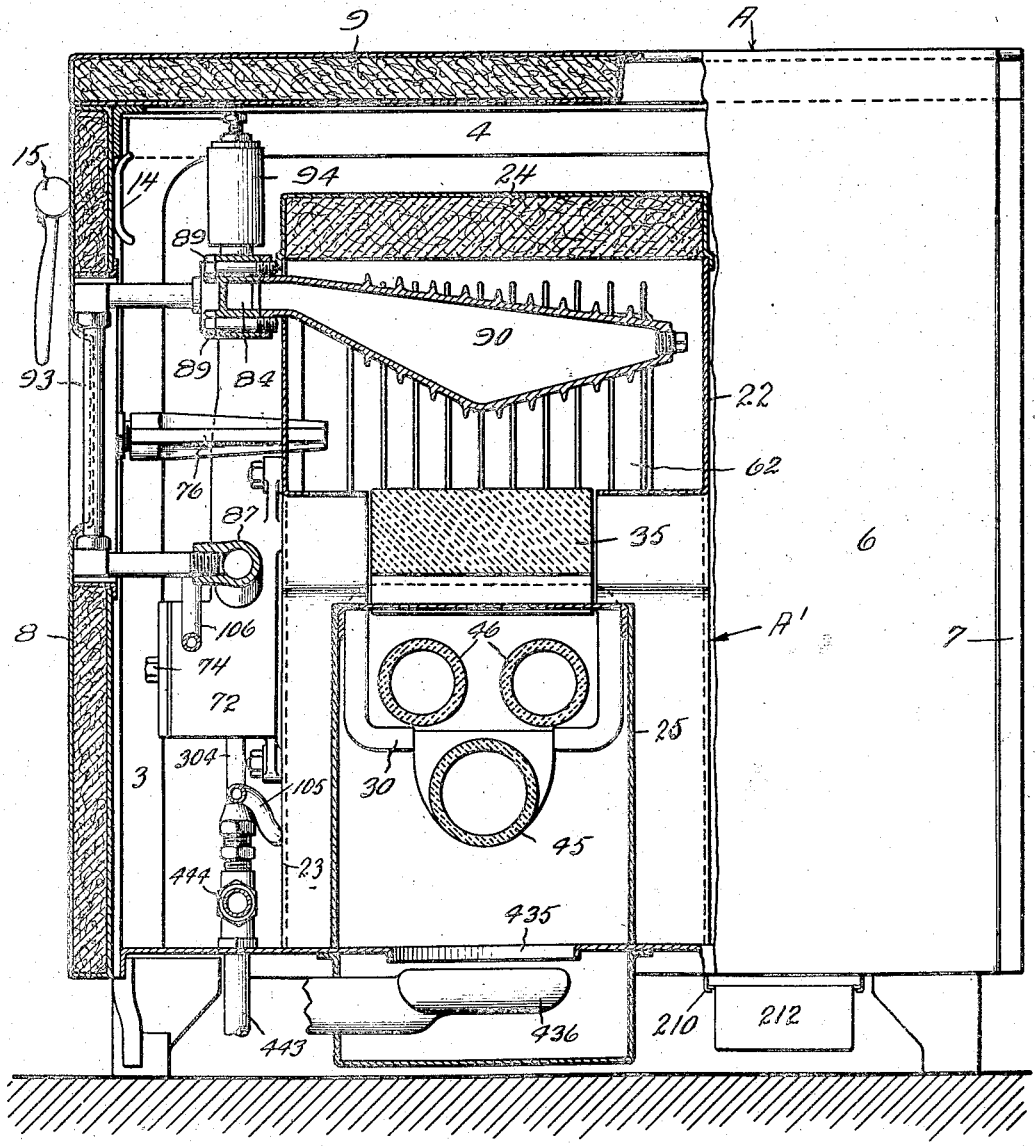

Located forwardly of the unit 68 is a water chamber 82 that is shown in sectional detail in Fig. 21. The front wall of said chamber is removable and is held in place as by cap screws 83. Said chamber communicates with the generator head 69 of the unit 68 through a conduit 84 that is shown as secured to the water chamber by screws 85, and to the unit 68 by screws 86; and the water chamber communicates with the hollow leg 71 of the unit 68 through a branch 87 of said leg, the outer flanged end of said branch being secured to the water chamber by screws 88. To a lateral hollow boss of the conduit 84 is secured, as by screws 89, a steam superheater 90 (see Figs. 6 and 8). The steam superheater is shown as provided with heat abstracting vanes 91.

A sight gage 93 of usual type communicates at its upper and lower ends with the conduit 84 and the branch 87 and is exposed through an opening in the side wall 8 of the casing so that at any time the water level in the generator and in the water chamber 82 may be ascertained at a glance. A blow-off or safety valve 94 which may be of any approved type is applied to the conduit 84 and is shown as being provided with a rearwardly extending exhaust pipe 95.

*Water circulating system.*

(*Reference numerals 96 to 133.*)

Situated in convenient relation to the oil burning apparatus A is a water tank 96 (Fig. 1) that receives water from the city supply through a pipe 97. The water is maintained at a substantially constant level in the tank by suitable float mechanism, shown in dotted lines and designated 98.

Figure 5:
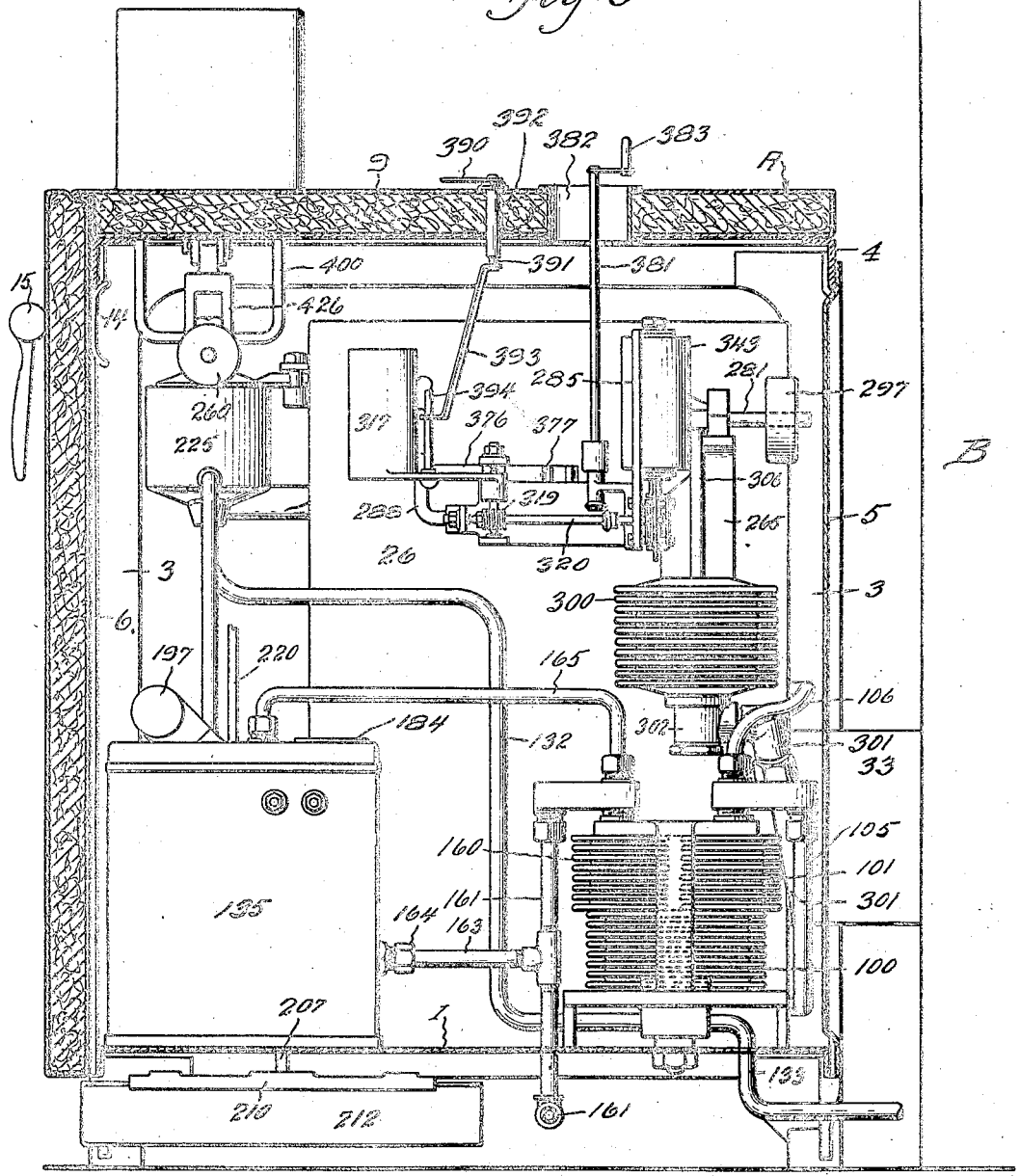

Located in the lower portion of the rear right hand corner of the casing of the oil burning apparatus (as best shown in Figs. 5 and 8) is pumping apparatus 100 which incorporates a water compartment 101 to which water is supplied from the tank 96 through pipes 102, 103, 104 and 105; and the water expelled from the compartment 101 by the pumping apparatus is conducted by a pipe 106 to the water chamber 82. It will be observed that this water chamber is divided into compartments 107 and 108 by an overflow partition 109 which determines the normal water level in the generator. Water in excess of that required to maintain the normal water level in the generator overflows the partition 109 into the compartment 108, and the outlet of water from this compartment is controlled by a thermostatic valve designated generally by the reference numeral 110. This valve is shown in detail in Fig. 22 (Sheet 15). Screwed into a threaded outlet extension 111 of the compartment 108 is a fitting 112 which terminates at its upper end in a valve seat 113. Cooperating with this seat is a valve 114 carried by a stem 115 that is guided within a sleeve 116 of a mounting 117 that is screwed onto the upper end of the fitting 112. The mounting is recessed about the valve 114 and its interior communicates with the compartment 108 through ports 118. A spring 119 is interposed between the body of the mounting 117 and an abutment 120 that is carried by the upper end of the valve stem 115. This spring tends to lift the valve from its seat. The upper end of the valve stem engages a head 121 of a bellows 122 which has its lower end secured, as through an annulus 123, to a shell 124 which encloses the bellows and is adapted to have connection, through means designated 125, with the mounting 117. This connection is preferably a separable one. A thermo-sensitive fluid occupies the space between the bellows 122 and the shell 124, the same being introduced into the shell about the bellows 122 through a filling tube 126 that is suitably sealed after the fluid has been introduced.

Under a relatively low temperature, the fluid within the shell 124 retracts and permits the spring 119 to maintain the valve 114 off the seat 113 thus allowing water within the compartment 108 to drain out through the ports 118 and through a pipe 128 to the previously mentioned pipe 104. Surmounting the pipe 104 is a filling column 130. To fill the water chamber and the generator, when preparing the apparatus for operation, water is poured into the column 130 and it flows through pipes 104 and 128 and into the compartment 108 of the water chamber, over the partition 109 and thence through the compartment 107 and branch 87 and leg 71 to the generator.

In order that this phase of the invention will be better understood, let it be supposed that the apparatus is in operation and that steam is present in the generator as well as in the upper portion of the water chamber 82 because it will be readily understood that the steam from the generator is communicated to the chamber through the conduit 84. The pumping apparatus is steam operated, the steam being conducted from a steam box, later to be described, to the pump through a pipe 132, and exhausted therefrom through a pipe 133. This pumping apparatus constitutes the subject matter of a separate invention and therefore need not be described in detail in this connection, and obviously any suitable pumping apparatus may be substituted therefor and, as long as there is steam pressure in the generator, the pumping apparatus will operate to circulate water through the pipe 106, compartments 107 and 108, pipes 128, 104 and 105. As long as water surrounds the thermostatic valve 110 the said valve will remain open because of the fact that it is protected from the heat of the steam and the water will be permitted to pursue the course already described. However, when the water is drained from the compartment 108 so as to expose a considerable part of the thermostatic valve, the thermo-sensitive fluid within the shell 124 will expand thus contracting the bellows thereby to close the valve and stop the flow of water to the pipe 128. When this occurs the water supply in the chamber 82 and in the generator is replenished from the tank 96 through the pipes 102, 103 and 104.

It will be seen therefore that at all times the water level in the generator is maintained at substantially the level of the upper edge of the partition 109 of the water chamber.

*Oil circulating system.*

(*Reference numerals 135 to 183.*)

At the front right hand corner of the casing of the oil burning apparatus, and resting directly upon the base 1, is an oil reservoir 135 which, as shown in Figs. 24 and 25, contains compartments 136 and 137, the former having an overflow tube 138 that leads to the compartment 137, while the latter compartment has an overflow tube 139 which discharges into a tilting bucket 140 that is supported, through knife-edge bearings 141, in V notches of bearing plates 142 that are applied to the sides of the reservoir 135. A valve casing 143 is rigidly secured to the rear wall of the reservoir 135, and the same is provided with inlet and outlet openings 144 and 145, respectively, between which is a valve seat 146 wherewith a valve 147 cooperates. The stem of this valve is guided through a bore in the lower end of the casing 143 and the end of said stem is adapted to be engaged by the bottom of the bucket 140. A spring 148 occupies the valve casing and is compressed between a plug 149, that closes the upper end of the casing, and a spring seat 150 which has a central point bearing on the valve 147. By this arrangement, an even seating of the valve upon the seat 146 is assured.

A tilting cup 153 is supported, through knife-edge bearings 154, in the V notches of bearing plates 155 that are carried by the side walls of the reservoir 135, and said cup is normally overbalanced by a weight 156 that is secured, as by a bracket 157, to the rear side of the cup. Adapted to rock with the cup 153 is a mercury switch 158 which is shown in the present instance as being carried, through straps 159, by the weight 156. This is a well known type of electric switch that is especially suitable for use in the presence of inflammable liquids, gases, or explosive substances, and it may be briefly described as consisting of a hermetically sealed glass tube containing a quantity of mercury which, when the tube is tilted in one direction, closes a circuit by bridging two enclosed contact points and, when the tube is tilted in the other direction, opens the circuit by withdrawing from one or both contact points. The purpose of this switch or circuit closer will presently be explained.

The previously mentioned pumping apparatus 100 includes an oil pumping compartment 160 which is adapted to receive oil through a pipe 161, and through suitable anti-siphoning connections later to be described, from a source of oil supply shown conventionally in Fig. 1 as an outside submerged tank 162. A branch 163 of the pipe 161 has connections through a union 164, with the outlet 145 of the valve casing 143. Oil is expelled from the compartment 160 of the pumping apparatus through a pipe 165 which leads through the top wall of the reservoir 135 in position to discharge into the tilting cup 153.

A fitting 167 (Figs. 2, 23, 24, 26 and 27) has two passageways 168 and 169 which communicate, respectively, through tubular extensions 170 and 171, with the compartments 137 and 136 of the oil reservoir. Passageway 168 also communicates, through a pipe 172, with the oil jet 56 of the main burner 50, while the passageway 169 communicates, through a branched pipe 173, with the oil jets of the auxiliary burners 51.

It is clear from the foregoing that the compartment 137 of the oil reservoir supplies the main burner with fuel and that the compartment 136 supplies fuel to the auxiliary burners, the oil level in the oil jets of the respective burners being determined by the height of the overflow tube of the corresponding compartment.

Figure 23:
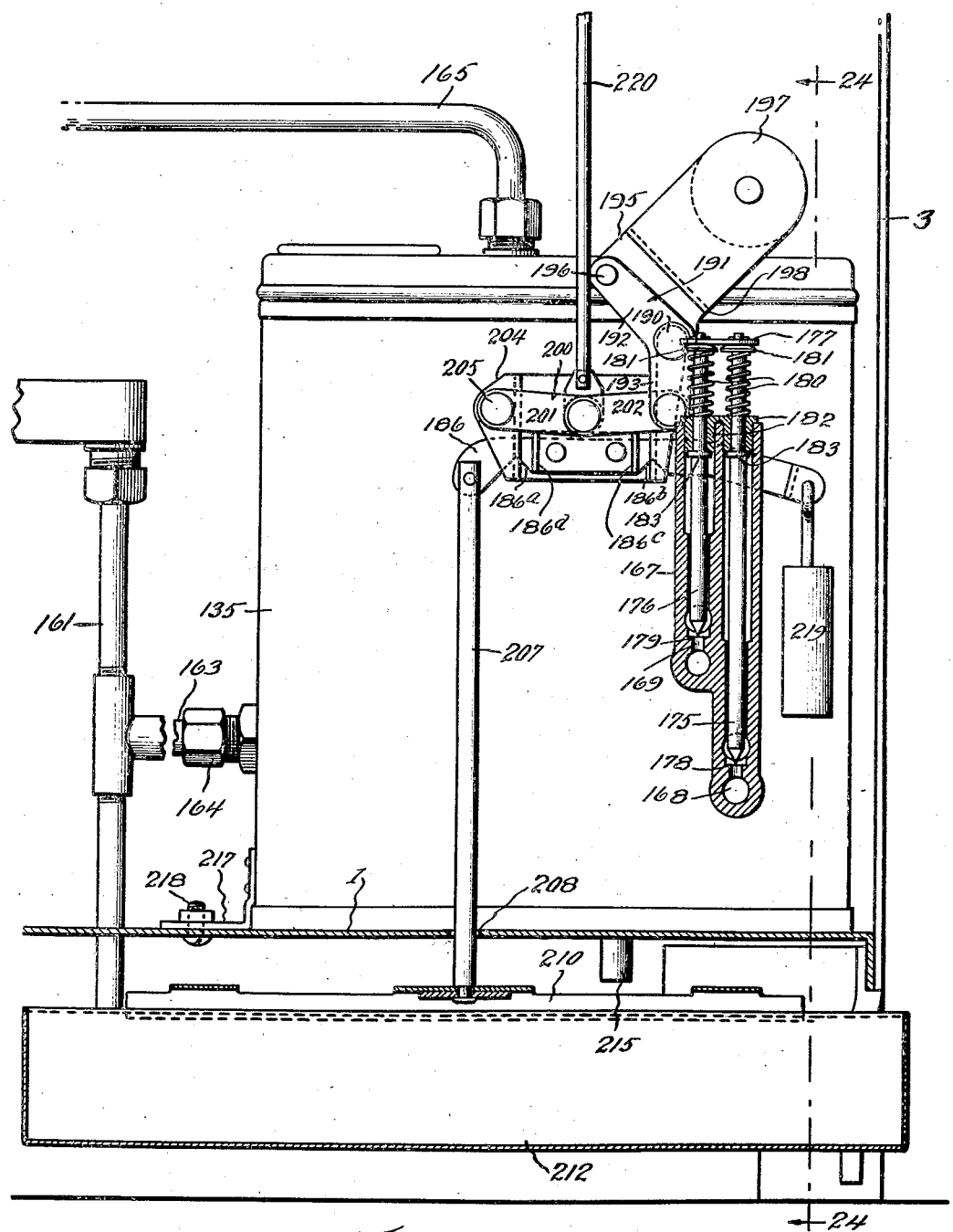

As best shown in Figs. 23 and 27, the passageways 168 and 169 are controlled by needle valves 175 and 176, respectively, the stems of said valves projecting a material distance above the upper end of the fitting 167 where they are provided with a common abutment 177. The valves are normally maintained off their seats (which are designated 178 and 179, respectively) by springs 180 that surround the exposed portions of the valve stems and are interposed between washers 181, that bear on the abutment 177, and the outer ends of bushings 182 which are fitted into the upper ends of the bores of the fitting 167 and wherein the valve stems are guided. Upward movement of the valves is limited by collars 183 on the valve stems that are arranged to engage the inner ends of the bushings 182.

In considering the operation of the oil circulating system it will be assumed that both compartments 136 and 137 are filled with oil to the height of their overflow tubes, and that sufficient oil is present in the bucket 140 to cause said bucket to be overbalanced. In this position, the rear end of the bucket is elevated and its bottom wall engages and lifts the stem of the valve 147, causing said valve to be maintained off its seat in opposition to the pressure of the spring 148. Now, with the pumping apparatus in action, oil is drawn through the valve casing 143 from the bucket 140, through the branch pipe 163, and pipe 161 to the oil compartment 160 of the pumping apparatus and expelled from said compartment through pipe 165 to the oil reservoir. The pipe 165 discharges, as previously stated, into the tilting cup 153, and when a sufficient quantity of oil has accumulated within said cup to overbalance the weight 156 and the parts associated with it, the cup will tilt and spill its contents into the compartment 136. This tilting action of the cup 153 is intermittent and continues as long as the apparatus is in operation.

While there is sufficient oil in the bucket 140 to maintain it in its tilted position, the valve 147 will remain open and at least a part of the demand of the oil compartment 160 of the pumping apparatus will be satisfied from this source. The remainder of the oil demanded by the pump will be drawn through the pipe 161 directly from the source of oil supply represented by the tank 162. When an insufficient quantity of oil is present in the bucket 140 to maintain it in its tilted position, the valve 147 will be closed by the spring 148, in which case all the oil demanded by the pump will be drawn directly from the oil supply.

Safety appliance.

(*Reference numerals 185 to 221.*)

Associated with the valves 175 and 176, above described, is a safety appliance which acts automatically to close said valves and thus shut off the supply of oil to the main and auxiliary burners, in case the valve 147 should become stuck or the bucket 140 fail to tilt, or in case the apparatus becomes overheated. This safety contrivance may also be manually operated from a remote point through suitable connections to shut off the oil supply to the burners in case of an emergency.

The safety appliance is best shown in Figs. 23, 24, 27, 28 and 29.

A bracket 185, shown in perspective in Fig. 28 and which is preferably formed from a sheet metal stamping, is riveted or otherwise secured to the side wall of the oil reservoir 135 in juxtaposition to the upper end of the fitting 167. A lever 186, shown in perspective in Fig. 29, extends through slots 187 in opposed parallel portions of the bracket 185, and knife-edge bearings, formed at the bottom of the slots 187, are received by notches in the lever 186. Thus two fulcrums are provided for the lever 186 and they are designated 186$^a$ and 186$^b$. Lugs 186$^c$ and 186$^d$ extend laterally from the lever 186, and these are conveniently formed by the right angle end portions of a plate that is riveted or otherwise secured to the side of the lever.

To the upper end of an arm 189 of the bracket 185 are pivoted, through a pin or rivet 190, a bell crank 191—having branches 192 and 193—and a plate 195. A portion of said plate lies alongside the branch 192 of the bell crank 191 and is connected to said branch by a fusible element 196. The end of the plate 195 opposite that connected to the bell crank 191 carries a weight 197, and the end portions of said plate 195 are offset with respect to each other to create intermediate thereof a transverse portion designated 198. When said plate is permitted to swing under the influence of the weight 197 the transverse portion 198 falls upon the abutment 177 that is carried by the upper ends of the stems of valves 175 and 176, the weight 197 being of sufficient heft to overcome the springs 180 and close said valves. The free end of the branch 193 of the bell crank 191 is connected, through a toggle joint 200—comprised of links 201 and 202 that are pivotally connected together at 203—with an offset portion 204 of the bracket 185, the connection between the toggle joint and said portion of the bracket being of a pivotal nature and designated 205.

When the parts are in normal condition the lever 186 rests on its two fulcrums 186ª and 186ᵇ and the knee of the toggle joint 200 is below a straight line between the end pivots of the joint. Under the influence of the weight 197 the parts are held in this condition with the links of the joint bearing upon the lugs 186ᶜ and 186ᵈ of the lever 186.

A rod 207 is pivotally connected to and depends from the rear end of the lever 186 and its lower end extends through an opening 208 in the base 1. Secured to the rod below the base is a carrier 210. This carrier is in the nature of a sheet metal frame which has its lateral edges turned downwardly and inwardly to form supporting rails 211, as best shown in Fig. 24. A pan 212 is removably supported by the carrier 210 through flanges 213 which extend outwardly from the upper edges of its side walls. A drain tube 215 extends from the bottom of the oil reservoir 135 through an opening 216 in the base 1 and is arranged to discharge into the pan 212. The reservoir 135 is shown as secured to the base 1 by an angle plate 217, one branch of which is riveted or otherwise secured to the rear wall of the reservoir, while the other branch is shown as fastened by a bolt 218 to the base. Suspended from the end of the lever 186 opposite that to which the rod 207 is connected is a weight 219, the purpose of which will presently appear.

In case a condition arises preventing the tilting of the bucket 140, or in the event the valve 147 sticks in closed position and fails to open in response to pressure applied to its stem by an overbalanced condition of the tilting bucket, the oil which continues to be pumped into the reservoir overflows the bucket 140 and drains through the tube 215 into the pan 212. When sufficient oil has accumulated within the pan to effect such action, the combined weight of the oil and the pan pulls down the end of the lever 186 to which the pan is connected (through the carrier 210 and rod 207) and rocks said lever on its fulcrum 186ª, causing the lug 186ᶜ of said lever to lift the toggle joint 200, breaking it above center and thus releasing the weight 197. As the weight drops, it forcibly projects the transverse portion 198 of the plate 195 against the abutment 177 and depresses the valves 175 and 176 onto their respective seats against the tension of the springs 180 to shut off the supply of oil to the burners, thereby stopping the operation of the apparatus.

Until the pan 212 containing the oil is removed from the carrier 210 the parts will remain in the condition described, avoiding the resetting of the toggle and the suspension of the weight in its normal position. The pan 212 is now removed from the carrier and emptied, and to avoid the apparatus being placed in condition for operation before the pan is returned to the carrier 210, the weight 219 is employed, the same functioning as I shall now describe. The weight 219 is of sufficient heft to overbalance the carrier 210 and the rod 207 and rock the lever 186 on its fulcrum 186ᵇ, thus elevating the lug 186ᵈ into a position that obstructs the return of the toggle 200 to its normal and weight sustaining condition. As soon as the pan 212 is returned to the carrier, the lever 186 is swung to its original condition wherein it rests on both fulcrums and the toggle and weight may now be reset to normal position. The springs 180 lift the valves 175 and 176 from their seats and communication between the oil supply and burners is accordingly resumed.

In case the apparatus becomes unduly overheated from any cause, the fusible element 196 is melted, releasing the plate 195 from the branch 192 of the bell crank 191, whereupon the weight 197 will throw the plate 195 into valve depressing position thereby to close the valves and shut off the burners.

In case of an emergency in which it is desirable to shut down the apparatus, the safety appliance may be tripped from a remote point through connections involving a rod 220 which has secured to its lower end a plate 221 that is pivoted to the knee of the toggle 200. By lifting the rod the toggle may be tripped and the weight 197 released. Also, by depressing the rod, the mechanism may be reset.

*Steam distribution and control.*

(*Reference numerals 225 to 262.*)

Located forwardly of the upper portion of the housing A' is a steam box 225. According to the present design, this steam box is, generally, of clover-leaf shape in plan, as shown in Figs. 17 and 18, and at its rear side is provided with a steam inlet 226 that is connected, through a nipple 227, with the steam superheater 90, said nipple extending through an opening in the front wall of the housing A'. The inlet 226 is separated from the main interior of the steam box by a partition 228, and extending through an opening in a horizontal portion of this partition is a thimble 229 that is carried by the bottom of a cup 230. This cup is set down into the steam box through a circular opening in the top wall thereof that is closed by a cover 231. The cup is shown as cylindrical and at its upper end is surrounded by a flange 232 that is clamped between the cover 231 and a shoulder surrounding said opening. The cover is held in place by a yoke 235 whose ends are secured to the steam box by cap screws 236. The cylindrical wall of the cup 230 is provided with openings 238, and extending about the inner side of said wall is a relatively fine mesh screen 239. This cup assembly constitutes a strainer which is designated, generally, by the reference numeral 240 and it serves to arrest sediment or scale which would otherwise be carried into the steam box from the generator and superheater. The ready removability of the cover 231 affords convenient access to the screen 239 for inspection, cleaning and replacement purposes.

Housed within the forward lobes of the steam box 225 are bellows 242. These bellows are constructed of accordion pleated cylindrical walls whose upper ends are crimped over the inner edges of annular plates 244, while their lower edges are similarly applied to the outer peripheries of annular plates 245. The bellows are adapted to be inserted through circular openings in the top wall of the steam box, and the outer edge portions of the plates 244 rest upon shoulders surrounding said openings. Covers 246 close said openings and bear at their peripheries upon the plates 244 and clamp them to the aforesaid shoulders when the covers are drawn down by the opposed forked arms of a cross head 247, mounted upon a screw 248 that is threaded into a boss 249 which depends from the top wall of the steam box intermediate the covers 246.

Carried by the lower ends of the bellows 242, through the intervention of the before mentioned plates 245, are units 250 which incorporate valves 251. These valves cooperate with seats 252 formed by the upper ends of thimbles 253 that are set within hollow bosses 254 in the bottom wall of the steam box.

Extending loosely through openings in the centers of the covers 246 are pins 255 whose lower ends are pointed and bear in conical depressions in the upper ends of the units 250. The pins are shaped at their upper ends to provide knife edge bearings that engage within V notches in levers 258, and the inner ends of said levers have opposed knife edge bearings 259 which engage within V notches in the opposite branches of the arms of cross head 247. Weights 260 are adjustable along the outer ends of the levers 258. These weights tend to swing the levers downwardly and, through the pins 255, depress the valves 251 and engage them with their seats 252.

Steam is distributed from the steam box 225, through a pipe 261 to the main burner 50; through pipes 262, which connect with the aforesaid bosses 254, to the auxiliary burners 51; and through the hereinbefore mentioned pipe 132 to the pumping apparatus 100.

It is apparent from the foregoing that the steam supply to the auxiliary burners is controlled by the valves 251, and these valves are opened when the steam pressure, communicated to the steam box from the generator and superheater, becomes great enough to contract the bellows 242 and lift the valves 251 from their seats against the opposition of the weights 260. The weights are so adjusted on their respective levers 258 as to cause said valves to open in sequence. The pipe 261, which leads to the main burner, enters the steam box a distance above the bottom thereof so as to avoid condensate from entering said pipe and interfering with the operation of said burner. Under the arrangement shown, any water of condensation which collects within the steam box passes through the pipe 132 to the pumping apparatus and is exhausted with the steam without in any way affecting the operation of the apparatus.

*Damper control.*

(*Reference numerals 265 to 307.*)

The weights 38, incorporated in the damper unit illustrated in detail in Figs. 19 and 20, tend to swing the damper 35 forwardly from the position wherein it is shown in Fig. 4 and in which position it shields the steam generator 62 from the products of combustion.

Supported by a bracket 265, secured to the previously mentioned plate 26, is mechanism for controlling the action of the damper. This mechanism is illustrated in detail in Figs. 9, 10, 11 and 12. The bracket 265 incorporates upper and lower arms 267 and 268, respectively, and rising from the former arm are bosses 269 in offset portions of which are V notches 270. Secured by screws 271 to the bosses 269 is a cap 272 which has depending lugs 273 in the lower ends of which are inverted V notches 274. Disposed between the arm 267 and the cap 272 is a fulcrum plate 275 which has downwardly facing knife edge bearings 276 and upwardly facing knife edge bearings 277 which engage, respectively, within the V-notches 270 and 274. The edges of the several knife edge bearings are in absolute alignment, as are also the crotches of the V notches 270 and 274, and as a consequence of this the fulcrum plate is held against vertical movement while being capable of free rocking movement on its knife edge bearings.

The reduced threaded end 280 of a rod 281 is extended through an aperture 282 in the fulcrum plate 275 and is screwed into a tapped hole in the rear end of a member 283 thereby to secure the plate 275 to the member 283; and said plate is held against turning on the rod 281, and in proper relation to said member, by the bearing of its upper edge against a shoulder 283ᵃ of the member 283. Secured to the forward end of the member 283, as by bolts 284, is a plate 285 to the lower left hand corner of which (as the same is viewed from the front) is secured a frame 287. A rod 288 has its rear end pinned or otherwise secured within a boss 289 that projects forwardly from the frame 287, and said rod is extended upwardly and laterally through a slot 290 in the plate 26. The rods 281 and 288 constitute, respectively, the rear and front ends of what is, in effect, a lever that incorporates, in addition to said rods, the member 283, plate 285, and frame 287. This lever, which for convenience I shall term the damper control lever, is designated generally 295, and its fulcrum, effected through the knife edge bearings of the plate 275, is designated 296. A weight 297 is carried by and is adjustable longitudinally of the rod 281 and assists in rocking the damper control lever in a direction to elevate its forward end which, as previously stated, is constituted of the laterally turned portion of the rod 288 and which portion, it will be noted, is in the approximate horizontal plane of the fulcrum 296. Connection is made, as by means of a chain 298, between the forward end of the damper controlled lever and the eye 44 of the damper unit.

From the description thus far it will be seen that when the forward end of the damper control lever rises it will, through the intervention of the chain 298, rock the damper unit in a direction to move the damper 35 toward generator-shielding position. The purpose of so moving the damper is to deflect all or a part of the products of combustion away from the generator and thus reduce the steam pressure in the generator, and this result is automatically accomplished through means which I shall now describe.

Supported by the lower branch 268 of the bracket 265 is a bellows 300 which is subjected to the pressure in the generator by reason of its communication therewith through a pipe 301 that leads from its connection with the bellows—made through a boss 302 which constitutes the terminal of the bracket arm 268—downwardly and laterally, back of the lower portion of the housing A', and thence forwardly where it joins, through a T 303, a vertical pipe 304 that connects through an elbow 305 the leg 71 of the generator head 69.

A rod 306 rises from the bellows 300 and its pointed upper end is engaged within a recess 307 on the underside of the member 283 a suitable distance forwardly of the fulcrum plate 275.

It is evident from the foregoing that when steam pressure within the generator rises sufficiently it will expand the bellows 300 and elevate the rod 306 thereby to swing the damper control lever 295 on its fulcrum 296 in a direction to move the damper toward generator-shielding position. The degree of steam pressure required to accomplish this action is determined by the adjustment of the weight 297 along the rod 281.

*Thermostatic governing mechanism for damper control.*

(*Reference numerals 310 to 394.*)

With nothing further in the way of a damper control than that above described, the fire could be kept at a substantially constant heat, the intensity whereof would be determined by the adjustment of the weight 297. For example; by adjusting the weight 297 inwardly from where it is shown, it would take a higher steam pressure than it would under the present adjustment to expand the bellows 300 and lift the forward end of the damper control lever 295 and swing the damper to generator-shielding position. This higher steam pressure would naturally result in the delivery of a greater amount of steam to the burner in a given period of time and consequently a greater amount of oil and the flame of the burner would be enlarged and the intensity of heat accordingly increased.

It is desired to increase and decrease the heat in accordance with the temperature of the room or enclosure that is being heated by the apparatus and this is accomplished automatically by mechanism described below.

Journaled in vertically spaced bearings 310 and 311 (Fig. 9) that are carried by the forward end of the frame 287 is a shaft 312 to which is pinned or otherwise secured the hub portion 315 of an arm 316 that incorporates a weight 317 at its outer end. Fastened to the shaft 312 below the hub 315 is a worm gear 318 that meshes with a worm 319 on a shaft 320. This shaft is supported at its forward end within a bearing 321 that is located at the corresponding end of the frame 287, while at its rear end the shaft passes freely through a hole 322, in the previously mentioned plate 285 (Fig. 14) and is journaled in a bearing 323 that is sustained by a channel member 325. Posts 326 support and space said channel member rearwardly from the lower portion of the plate 285. Rotatably supported in bearings carried by opposed portions of said plate and channel member, and in substantially the same horizontal plane as shaft 320, are stub shafts 327 and 328.

Driving connection is established between shafts 320 and 328 through gears 330 and 331 that are secured to said shafts, respectively, and mesh with an intermediate gear 332 that is fastened to the shaft 327. Also secured to shafts 320 and 328, rearwardly of the gears 330 and 331, are ratchet wheels 333 and 334. These ratchet wheels are adapted to be engaged by the respective pawls 335 and 336, shown as formed by lugs that are struck outwardly from plates 337 and 338. The outer edge portions of said plates are turned back upon the body portions thereof, as shown particularly in Fig. 14, so as to increase the weight of the outer portions of the plates for a purpose which will presently appear. The plates 337 and 338 are pivotally connected, as indicated at 340, to the movable core sections 341 of solenoids 342 and 343. These solenoids are secured to and depend from the rearwardly extended upper end 285$^a$ of the plate 285. The connection between the solenoids and said plate is shown as effected through screws 345 that are projected through holes in the plate and are threaded into fixed core sections 346 of the solenoids. The pawl carrying plates 337 and 338 are guided within slots in the top and bottom flanges of the channel member 325, and the distance they are permitted to swing inwardly under the influence of their weighted outer edge portions is limited by the engagement of their inclined inner edges with the shafts 320 and 328. The descent of the movable core sections 341 is limited by their engagement with the top flange of the channel member 325, and when in their lowest positions sustain the plates 337 and 338 at such an elevation that the pawls 335 and 336 are slightly out of reach of the teeth of the ratchet wheels 333 and 334.

It is clear from the construction above described that when solenoid 342 is energized and its movable core section is retracted, it will elevate the plate 337 and engage the pawl 335 that is carried thereby with a tooth of the ratchet wheel 333 and impart to said wheel, and to shaft 320 to which it is secured, a partial rotation. This movement of the shaft is transmitted, through the worm 319 and worm wheel 318, to the shaft 312, thus causing the latter shaft to be rotated in a direction to swing the weight 317 forwardly. Obviously, the weight is moved rearwardly—through an arc indicated by the line $a$—$a$ of Fig. 10— by the energization of solenoid 343, it being remembered that the shaft 328, which carries the ratchet wheel 334, is actuated through the pawl 336 of plate 338 that is carried by the movable core section of solenoid 343, and that said shaft has driving connection with the shaft 320 through the gears 331, 332 and 330.

Figure 30:
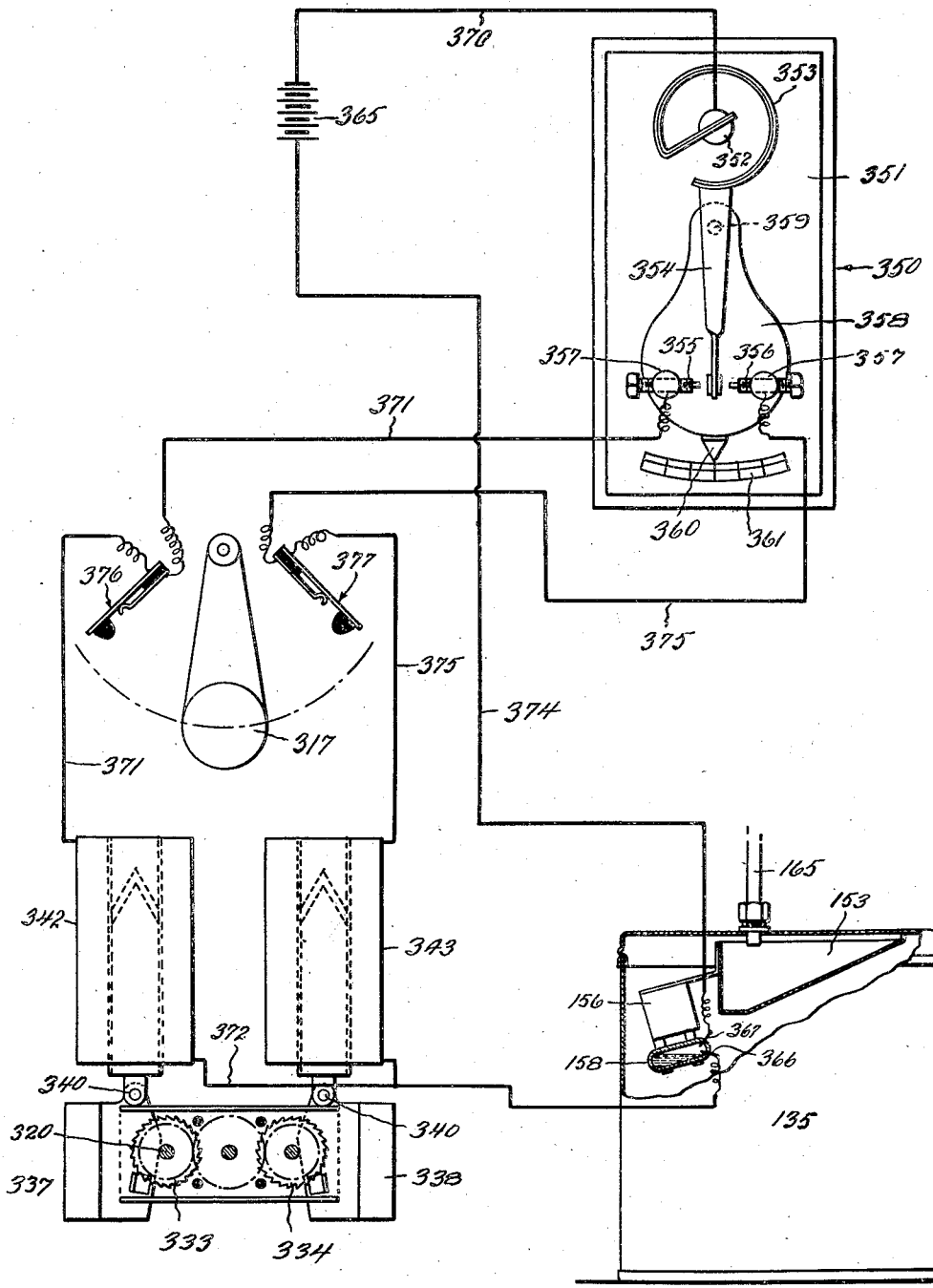

The circuits through which current is supplied to the solenoids 342 and 343 are shown in the diagram of Fig. 30.

350 designates the room thermostat which is located, as previously explained, in the room or enclosure that is heated by the apparatus. The thermostat comprises a base 351 on which is mounted a post 352 to which is fastened the thermal sensitive element 353 that carries a tongue 354. The free end of the tongue is adapted to swing between contacts 355 and 356 which are shown as adjustable within studs 357, carried by a plate 358 that is pivoted at 359 to the base 351. At the lower extremity of the plate 358 is a pointer 360 which cooperates with a scale 361 on the base. This scale is graduated to represent degrees of temperature, and by adjusting the plate with respect to the scale, the contact points 355 and 356 may be shifted for the purpose of maintaining the approximate degree of temperature to which the pointer 360 is directed on the scale. The range of temperature may be varied by adjusting the points 355 and 356 toward and from each other. This is in accordance with usual practice and will be readily understood.

A source of electric energy is represented by a battery shown conventionally at 365. Also shown more or less diagrammatically in Fig. 30 are the solenoids 342 and 343 and the oil reservoir 135 with its tilting cup 153 which carries the mercury switch 158 incorporating contact points 366 and 367. It will be recalled that as long as the apparatus is in operation and oil is being circulated through reservoir 135, the tilting cup 153 will continue to rock back and forth thereby oscillating the mercury switch 158 and intermittently bridging the contact points 366 and 367.

When the temperature affecting the room thermostat falls below a predetermined value the tongue 354 will be caused to swing into engagement with the contact point 355 thereby establishing a circuit through which the current flows from the battery 365 through a conductor 370, post 352, element 353, tongue 354, contact point 355, conductor 371 to the winding of the solenoid 342 from whence it returns to the battery through a conductor 372, the intermittently bridged contact points 366 and 367 of the mercury switch 158 and a conductor 374. This results in pulsations of current passing through the winding of solenoid 342 as long as the tongue 354 remains in engagement with the contact point 355. Upon each energization of the solenoid 342, the ratchet wheel 333 will be given a partial rotation and this is transmitted through the shaft 320, worm 319 and worm wheel 318 to the shaft 312 which carries the weight 317, resulting in said weight being moved outwardly. As a result of this, the forward end of the damper control lever 295 will be lowered and the damper 35 moved outwardly from generator-shielding position under the influence of the weight 43. This will permit a greater proportion of the heat from the burner flame to pass about the generator 62 thereby to increase the steam pressure and enlarge the flame, and the damper will remain in its newly assumed ineffective position until the steam pressure in the generator rises sufficiently to expand the bellows 300 in opposition to its increased load by reason of the outward movement of the weight 317; and upon the expansion of the bellows under these conditions the free end of the damper control lever will be elevated and will return the damper to generator-shielding position.

This relatively high steam pressure is maintained so long as the weight 317 remains in its outward position; and it is clear that the weight will continue to be moved outwardly—until it reaches its extreme forward position—as long as the tongue 354 remains in engagement with the contact 355. When the temperature affecting the room thermostat rises sufficiently to withdraw the tongue 354 from said contact point, the weight 317 will remain in its newly assumed position.

In case the temperature rises further and causes the tongue 354 to be swung into engagement with the contact point 356, a circuit will be established from the battery 365 through conductor 370, the elements of the thermostat including contact point 356, a conductor 375, the winding of solenoid 343, and thence to the battery through the conductor 372, the mercury switch 158, and the conductor 374. This will cause intermittent energizations of the solenoid 343 which will result in a step by step rotation of the ratchet wheel 334 and this movement is transmitted through the shaft 328 and gears 331, 332 and 330 to the shaft 320, rotating said shaft in the opposite direction to that in which it was rotated by the solenoid 342 and, as a consequence thereof, the weight 317 will be gradually moved inwardly and the steam pressure will be reduced, as will be readily understood.

In cases where, by reason of extreme temperature changes, the thermostatic switch is caused to remain closed after the weight 317 has reached the limit of its movement in either direction, there would be a needless waste of current and undue drain on the battery unless provision were made to open the circuit. This is automatically accomplished by including in the solenoid circuits, represented by the conductors 371 and 375, the respective switches 376 and 377, shown particularly in Figs. 10 and 30. These switches are shown as comprising spring contact plates that are normally in engagement with each other and which are adapted to be separated when insulation buttons, carried by the longer plates of the respective switches, are engaged and moved by the arm of the weight 317.

There are times when it is desirable to effect an increase or a decrease in the heat produced by the apparatus more promptly than can be accomplished through the automatic means above described. To enable this to be done, I include manually operated means for shifting the weight 317.

Rotatably and slidably mounted within a boss 380 that is incorporated in the frame 287 is a shaft 381 whose upper end protrudes through an opening 382 in the top wall of the casing of the apparatus. An operating handle or crank 383 is secured to said shaft above the casing. A bevel pinion 385 is fastened to the lower end of the shaft 381, and the same is adapted to mesh with a similar pinion 386 on the shaft 320. Surmounting the boss 380 is a cup shaped casing 387, and a spring 388 is compressed between the bottom of this casing and a collar 389 that is pinned or otherwise secured to the shaft 381. Said spring tends to elevate the shaft and withdraw the pinion 385 from the pinion 386. When it is desired to adjust the weight 317 manually, it is only necessary to grasp the crank 383 and depress the shaft 381 sufficiently to mesh the pinion 385 with pinion 386 and rotate the shaft in an appropriate direction to swing the weight inwardly or outwardly. In order that the position of the weight may be readily ascertained from outside the casing of the apparatus, an indicator 390 is mounted on top of the casing. This indicator is secured to a shaft 391 which is journaled in a bushing 392 that is set within the casing wall in approximate alignment with the shaft 312 that carries the weight 317. Connection is made between the indicator shaft 391 and the weight through an arm 393 which has one of its ends secured to said shaft and its other end bifurcated to embrace a pin 394 that rises from the weight-carrying arm 316. The nature of the connection between the arm 393 and pin 394 allows for free swinging movement of the damper control lever 295. Through the connections described, the movement of the weight within the casing is imparted to the indicator 390.

*Furnacestat.*

(*Reference numerals 400 to 429.*)

It has been explained how the auxiliary burners are thrown into operation through an increase in steam pressure by the contraction of first one and then the other of the bellows 242 according to the adjustment of their respective weights 260 and the lifting from their seats of the valves 251.

If, under the intense heat of the flame produced by all of the burners, the temperature of the apparatus becomes dangerously high, the auxiliary burners are automatically shut off by mechanism that is under the control of a so-called "furnacestat".

Figure 15:
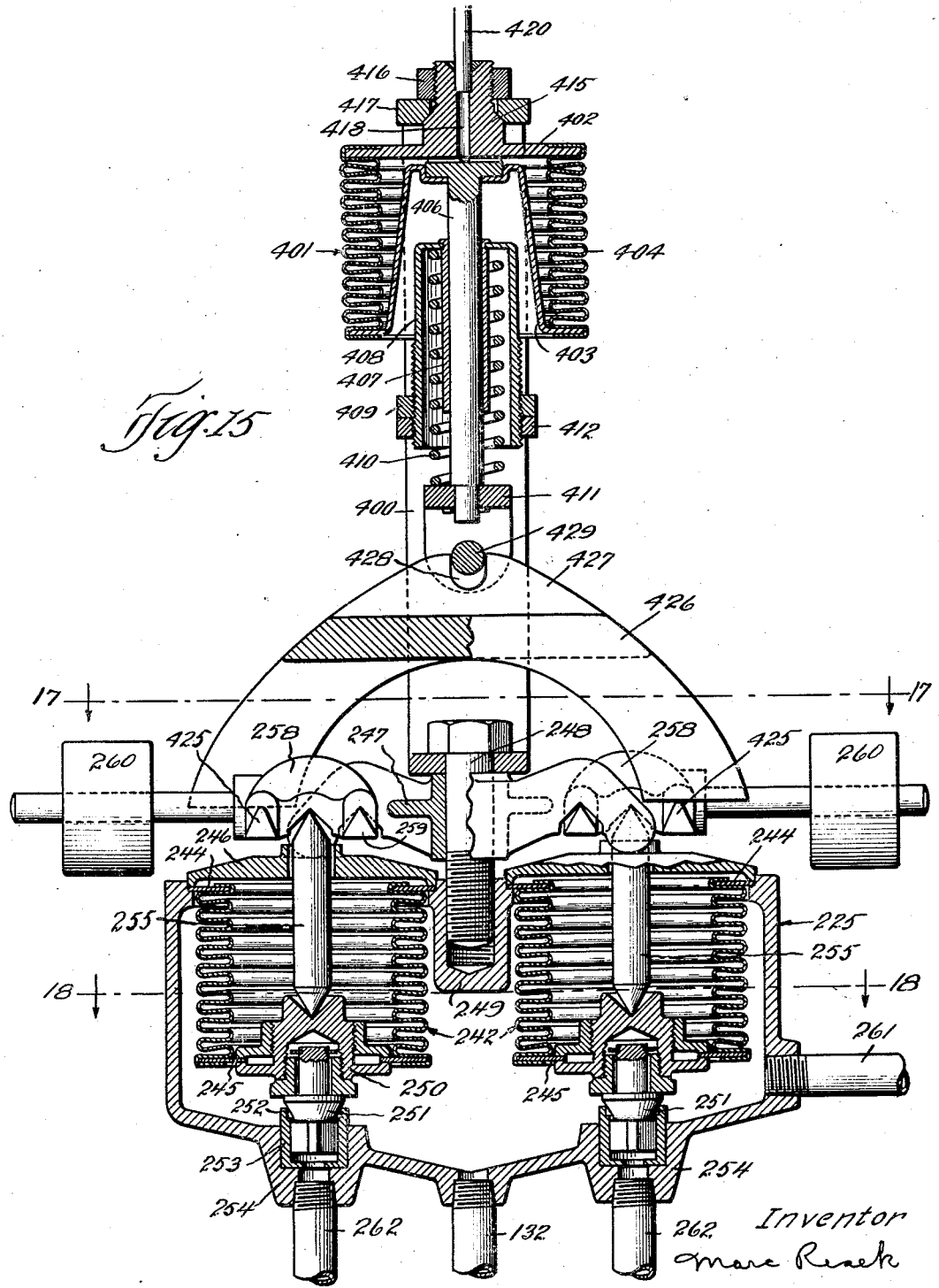

Secured in place above the steam box 225 by means of the beforementioned screw 248 is a frame 400 which carries at its upper end a bellows 401. As shown in Fig. 15, this bellows is comprised of a top wall 402 and a bottom wall 403 that are connected together by an accordion pleated cylindrical wall 404. The bottom wall has a reentrant portion which extends at its central portion almost to the top wall—when the bellows is in contracted condition. A pin 406 has its upper end secured to the central portion of the bottom wall 403 and the same is guided within a sleeve 407 that is carried by the bottom of an inverted cup 408 that is externally threaded adjacent its lower end and has screw connection with a cross member 409 of the frame 400. A spring 410 is compressed between the end wall of the cup 408 and the forked head 411 attached to the pin 406. The tension of this spring may be varied by adjusting the cup 408 within the cross member 409, and the cup is adapted to be locked in any adjusted position, as by means of a nut 412.

The top wall 402 is provided with a central boss 415 which is clamped, as by means of a nut 416 that is applied to the upper end of the boss, to the cross member 417 of the frame 400. A port 418 leads into the bellows through the boss 415, and connected to the outer end of the boss in register with the port is a tube 420 that leads to the furnacestat 421 that is shown in Fig. 1. This device is of standard construction and comprises a container that encloses a quantity of thermal sensitive fluid or liquid. As said fluid or liquid vaporizes or expands under heat it creates a pressure that is communicated through the tube 420 and port 418 to the bellows 401, causing said bellows to expand and depress the pin 406.

Resting upon opposed bearings 425 of the levers 258 are the forked branches of a yoke 426. This yoke terminates at its upper end in a fin 427 that reposes between the branches of the forked head 411 of pin 406, and said fin is notched at 428 to receive a cross pin 429 that is carried by said head.

When the bellows 401 is in contracted condition the pin 429 is lifted a material distance from the bottom of the notch 428, as shown in Fig. 15, so that the yoke 426 is at liberty to rise in response to the lifting of the valves 251 caused by a contraction of the bellows 242. The bellows 401 is normally held contracted by a partial vacuum within a closed system including, with said bellows, the tube 420 and the "furnacestat". By this action, the spring 410 is held compressed.

In case the auxiliary burners are in operation and the temperature of the furnace becomes excessively high, the fluid within the "furnacestat" will expand and will create a pressure that will be communicated through the tube 420 to the bellows 401, causing the bellows to expand and depress the pin 406 and, with it, the yoke 426, thereby to swing the levers 258 downwardly and reseat the valves 251 through the intervention of the pins 255, shutting off the auxiliary burners. The spring 410 is employed for accomplishing this result in case a leak should occur which would destroy the partial vacuum normally prevailing within the system.

Miscellaneous.

(Reference numerals 435 to 445.)

Below and in register with an opening 435 in the base 1 beneath the burner tubes 45 and 46 is a pre-heating burner 436, shown as a gas burner. The pre-heating burner—the products from which rise through the opening 34 in the top wall of the combustion chamber and pass about the generator 62—is used to initially heat the generator and create steam for setting the injector burners in operation. The action of the main and auxiliary burners may be observed through a window 438 in the front wall 6 of the casing.

The value of the steam pressure in the generator 62 may be ascertained at any time by the inspection of a steam gauge 440 (Fig. 1) that has connection, through a tube 441, with the rear end of the conduit 84.

Figure 3:
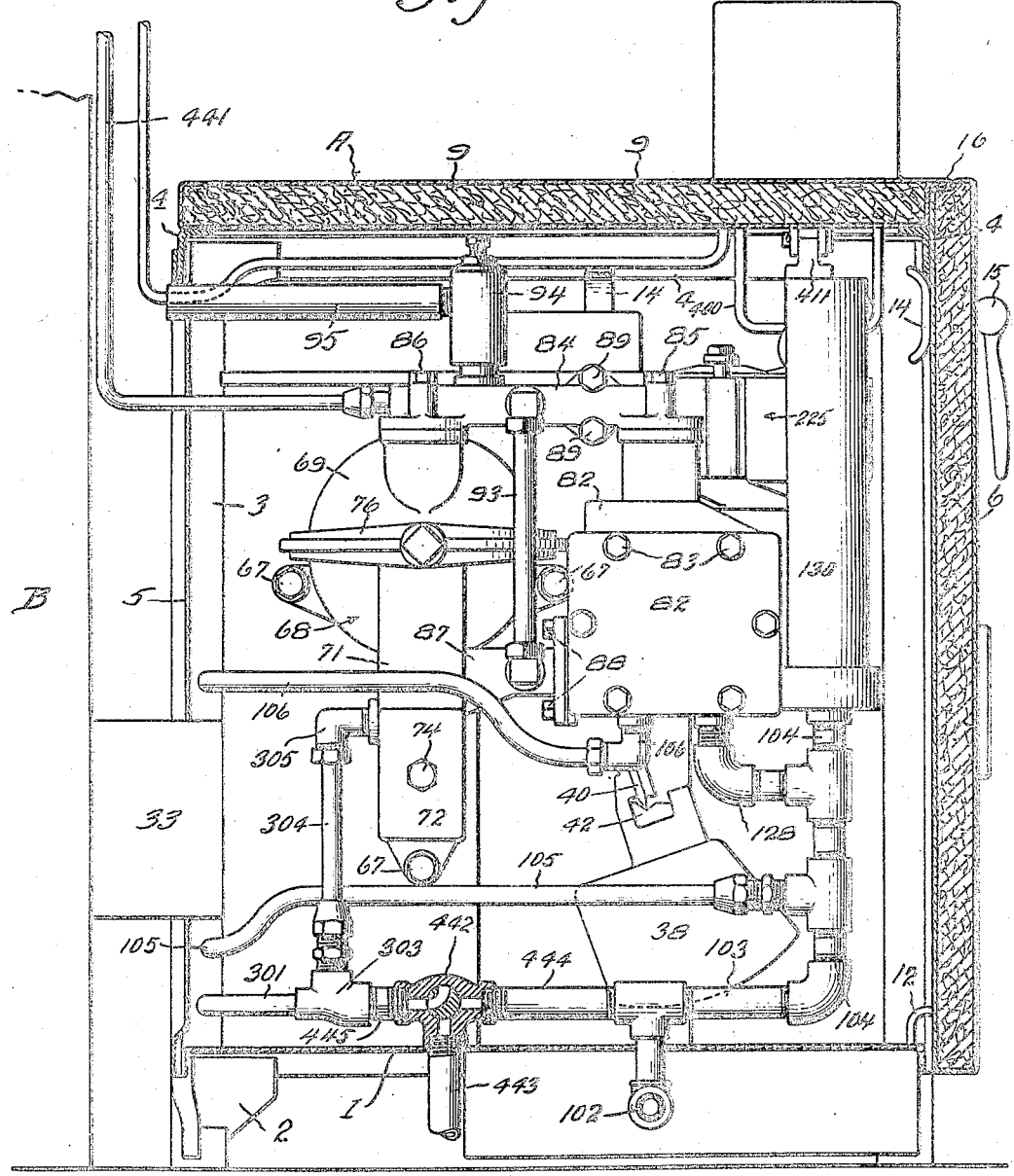

The system may be drained when desired through a 3-way valve 442 (Fig. 3) which has one branch of its casing connected to a waste pipe 443, another of its branches connected through a pipe 444 with the pipe 103, and its remaining branch, connected, through a pipe 445, with the T 303. By turning the valve to a position wherein pipes 443 and 444 are caused to communicate (and after shutting off a valve 102$^a$ in pipe 102, see Fig. 1) the contents of pipes 104 and 105 and any water which is in the column 130 and in the compartment 108 of the water chamber 82, may be allowed to flow through pipes 103 and 444 to the waste pipe 443. By turning the valve 442 to a position wherein communication is established between the waste pipe 443 and pipe 445, the contents of the generator and the compartment 107 of the water chamber 82, and the contents of the bellows 300 may be permitted to drain through pipes 304 and 301 to the waste pipe 443. Any sediment deposited within the bottom of the leg 71 of the generator head may be removed by taking off the cover 72.

The action of the above described embodiment of the invention will be clear from the preliminary description of its operation, and from the foregoing explanations of the manner in which the several parts function.

Second embodiment—Figs. 31 to 39.

(*Reference numerals 450 to 530.*)

In this embodiment of the invention I employ fuel oil burning apparatus shown in central vertical section in Fig. 32. This apparatus constitutes the subject matter of my previously mentioned copending application Serial No. 24,052, and for a more detailed description of the same than is herein given, reference may be had to said application.

Generally, the apparatus comprises a box-like metal casing 450 within the lower portion of which is housed a combustion chamber 451 that is constructed of suitable refractory material, and within the roof of said chamber is an opening 452 that is adapted to be closed by a damper 453 which is fulcrumed at 454 on the forward end of a frame 455 which surrounds the upper edge of said opening. The rear end of the damper 453 has connection, through a link 458, with a damper control lever 459. Adjacent the front wall of the casing 450 said lever has knife edge bearings 460 which rest within V notches in a bearing member 461 that is supported from an adjacent portion of the casing. The forward end of the damper control lever extends through an opening in the casing and incorporates a pair of rods 463 on which is adjustably mounted a damper control mechanism 465, shown in detail in Figs. 33 to 39 and which presently will be described. The weight of the mechanism 465 tends to rock the lever 459 in a direction to open the damper 453 and permit a portion of the products of combustion from the burner 466 to pass through the opening 452 and about a steam generator 467 that is housed within the upper rear portion of the casing 450. Both the combustion chamber 451 and the space about the generator 467 open into the fire box 468 of a furnace 470.

The burner 466 is of the injector type, and steam is conducted from the steam generator 467 to the steam nozzle 471 of the burner through a pipe 472, said pipe communicating with the generator through a steam dome 473. Oil is supplied from a suitable source to the oil jet 475 of the burner through a pipe 476.

Located with its axis slightly inwardly of the vertical plane of the fulcrum of the damper control lever 459 is a bellows 478 that communicates with the generator 467 through a pipe 479. Between the lower end of the bellows and the bottom wall of a depression in the damper control lever is a thrust pin 480. It will be seen from this arrangement that the weight of the mechanism 465 is opposed by the steam pressure within the generator through the action of the bellows 478.

Assuming there is water present in the generator to a level maintained by suitable float mechanism (not shown); and that the damper 453 is held in open position by the weight of the mechanism 465, the apparatus is started in operation by lighting a pre-heating burner 482 that is located within the bottom of the combustion chamber below the opening 452. The flame from the pre-heating burner will rise through said opening and pass about the generator, creating steam therein, and this steam will be communicated through the pipe 472 to the steam jet 471 of the burner. As the steam issues therefrom it will eject oil from the oil jet 475, the resultant mixture being ignited by the flame from the pre-heating burner. The oil supplied to the pre-heating burner will eventually burn out, and the apparatus will continue to operate with a portion of the heat from the main burner flame passing through the opening 452. This condition will prevail so long as the damper 453 remains open; but as the steam pressure increases within the generator and this pressure is communicated through the pipe 479 to the bellows 478, said bellows will be caused to expand and depress the inner end of the damper control lever thereby to move the damper towards closed position.

The mechanism 465 is similar in principle to the mechanism which controls the damper in the previously described embodiment. Enclosed within the upper portion of a housing 485 are solenoids 486 and 487. The lower ends of the movable core sections 488 of these solenoids are connected, through links 489, with pawls 490 that are pivoted at 491 to pawl carrying plates 492. These plates are mounted for oscillation on a shaft 493 that is journalled in a frame 495, secured at 496 to the lower portion of the housing 485. Fastened to the shaft 493, intermediate the plates 492 is a toothed wheel 498 wherewith the pawls 490 are adapted to cooperate. The normal position of the plates 492 is determined by the engagement of stops 499, that are adjustably carried by said plates, with side walls of the lower portion of the housing 485. It will be noted that the links 489 are connected to the pawls 490 inwardly of their pivotal connections 491 with the pawl carrying plates. Consequently, when the solenoids are energized and their movable core sections are retracted, the pawls 490 are first caused to rock on their pivots until their free ends engage between teeth of the wheel 498, and further movement of the solenoid cores results in an oscillation of the plates 492 on the shaft 493 and a consequential partial rotation of the wheel and shaft.

A worm 500 that is secured to the inner end of the shaft 493 meshes with opposed worm wheels 501 that are carried by vertical shafts 502, rotatably supported, through the virtue of bearings 503, in the previously mentioned frame 495. To the lower ends of the shafts 502 are secured the hub portions of arms 504 which carry at their free ends weights designated 505.

It is evident from the construction just described that when solenoid 486 is energized it will rotate, through the wheel 498, shaft 493, worm 500, and worm wheels 501, the shafts 502 in a direction to move the weights 505 outwardly—assuming that the worm 500 has a right hand thread. Conversely, when the solenoid 487 is energized it will, through the aforesaid driving connections, move the weights 505 inwardly or toward the position wherein they are illustrated in the drawings.

The adjustment of the weights may be manually accomplished by means of a hand wheel 506 that is carried by the forward end of the extension 507 of the shaft 493.

Figure 31:
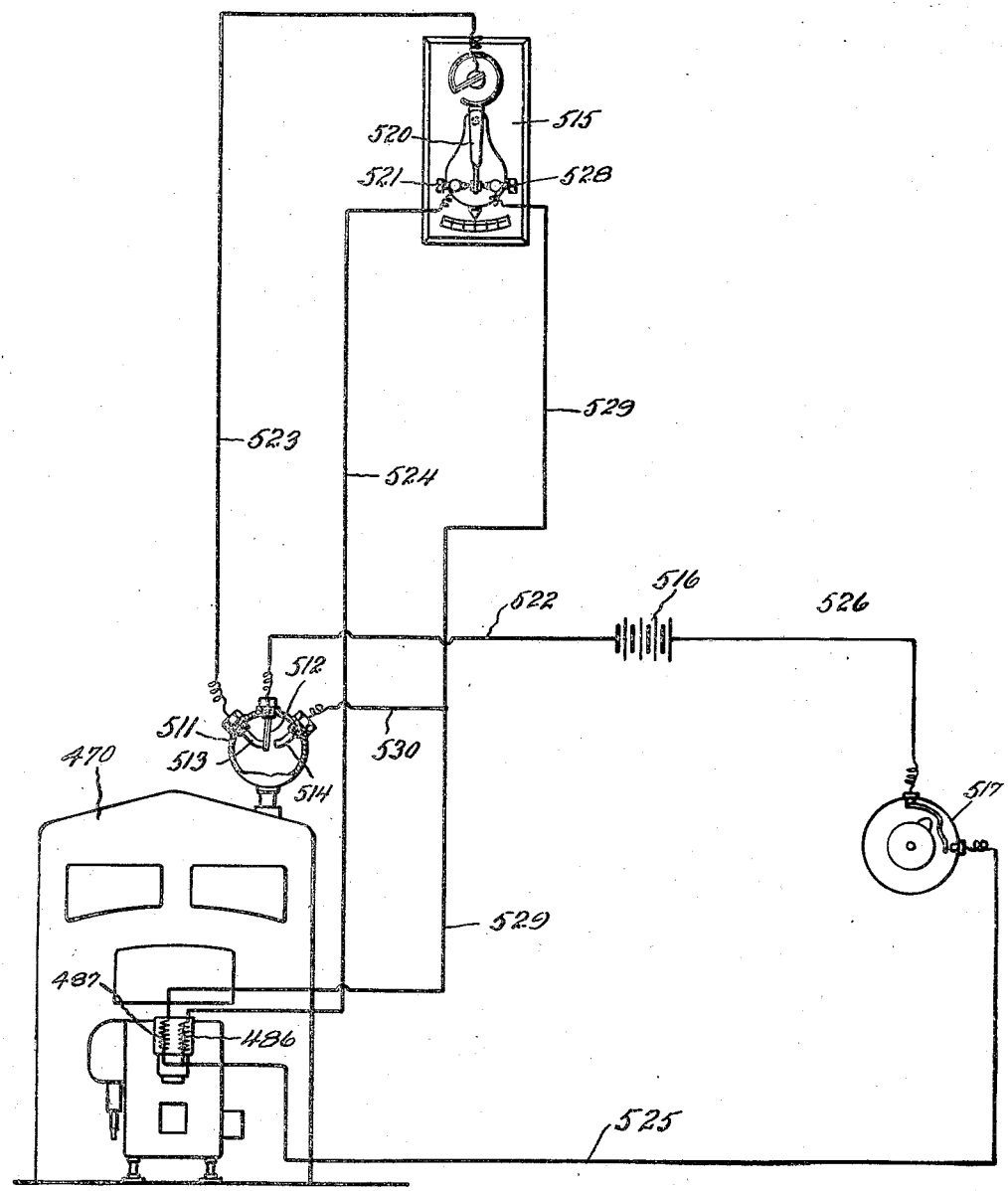

In the diagram of Fig. 31, the apparatus is shown as situated in front of the furnace 470 that is equipped with a "furnacestat" 511. In the present case, this instrument is in the nature of a thermostat, the thermal sensitive element of which is designated 512 and swings between contacts 513 and 514, the element normally engaging the former contact, and engaging the latter contact only when the temperature of the furnace rises to an excessively high degree. A room thermostat, similar to the one above described, is shown at 515; a source of electric energy is shown conventionally as a battery at 516; and a suitable intermittent circuit closer is shown at 517. This may be a clock-work operated switch, or such a switch as that described in connection with the first embodiment of the invention.

Assuming that the room temperature has dropped sufficiently to cause the tongue 520 of the thermostat to swing into engagement with the contact 521, a circuit is established, from the source of energy 516, through conductor 522, element 512 of the "furnacestat", contact 513, conductor 523, tongue 520, contact point 521 and conductor 524 to the winding of solenoid 486 from where it continues on through the conductor 525, circuit closer 517 and conductor 526, to the source 516. This will cause an impulse of current to flow through the winding of solenoid 486 each time the circuit closer 517 closes the circuit and as long as the thermostat remains in its present condition. Through intermittent energization of the solenoid 486, the weights 505 will be caused to travel with a step-by-step movement toward their forward positions. As the weights move forwardly, the center of gravity of the mechanism 465 is correspondingly shifted, thus increasing its lifting influence on the damper 453. This will result in more heat being delivered to the generator and a higher steam pressure being created therein which will naturally enlarge the burner flame and increase the heat thereof. The damper will remain in its newly adjusted position until the effective increased weight of the mechanism 465 is counteracted by the increased steam pressure that is communicated through the pipe 479 to the bellows 478.

In the event the room temperature rises sufficiently to cause the tongue 520 of the thermostat to engage contact point 528, a circuit will be established as above described excepting that the current will be directed through the contact point 528, and a conductor 529 to the winding of the solenoid 487 which also has connection with the return conductor 525. The energization of this solenoid, as previously explained, effects an inward movement of the weights 505.

In case the furnace becomes overheated, the "furnacestat" acts to reduce the fire regardless of what the room temperature may be. This is accomplished by connecting contact 514 of the "furnacestat", through a conductor 530, with conductor 529. Under the conditions above mentioned, the element 512 of the "furnacestat" swings into engagement with the contact 514 whereupon current will flow from the source 516 through conductor 522, element 512, contact 514, conductors 530 and 529, through the winding of solenoid 487, the conductor 525, circuit closer 517 and conductor 526, back to the source. This will cause the weights 505 to be moved rearwardly with the result that the damper 453 will be closed to shield the generator from the heat of the burner flame and reduce the steam pressure, thereby to diminish the flame.

*Third embodiment—Figs. 40 to 44.*

(*Reference numerals 450ᵃ to 507ᵃ and 530 to 575.*)

The oil burning apparatus used in the present embodiment of the invention is the same as that above described in connection with the second embodiment, and for convenience I have designated the parts of the present apparatus by the same reference numerals as are used to designate the corresponding parts of the previously described apparatus, augmented by the exponent "a".

The difference between the second and third embodiments lies in the "furnacestat" control. As will presently appear, the damper is normally under the control of a variable weight that is actuated by thermostatically controlled mechanism. However, when the condition of the furnace makes it desirable to shut down the fire, the "furnacestat" functions to remove the influence of the variable weight from the damper and substitute therefor a constant minimum weight, which permits the damper to close in response to a pressure of steam in the generator which is above a predetermined relatively low value.

Pivoted at 535 to the damper control lever 459ª on an axis coincident with its knife edge bearings 460ª are arms 536 which carry the damper control mechanism 465ª. The pivoted ends of the arms 536 are formed with heels 537 (Fig. 44) which are adapted to bear upon ledges 538 that are formed on the branches 539 of the damper control lever 459ª to which the arms are pivoted, said branches 539 terminating in bosses 540. Pivotally connected to the outer ends of the bosses 540, as through screws 541 which are in axial alignment with the pivots 535, are arms 542 which carry weights 543 at their outer ends. The arms 542 are also provided with heels, designated 544, which are adapted to engage the ledges 538. Mechanism is employed for lifting one or the other sets of arms 536 or 542, so as to remove their heels from the ledges 538 and, when so lifted, their respective weights (which in the case of arms 536 is the mechanism 465ª) have no effect upon the damper control lever 459ª.

Figure 43:
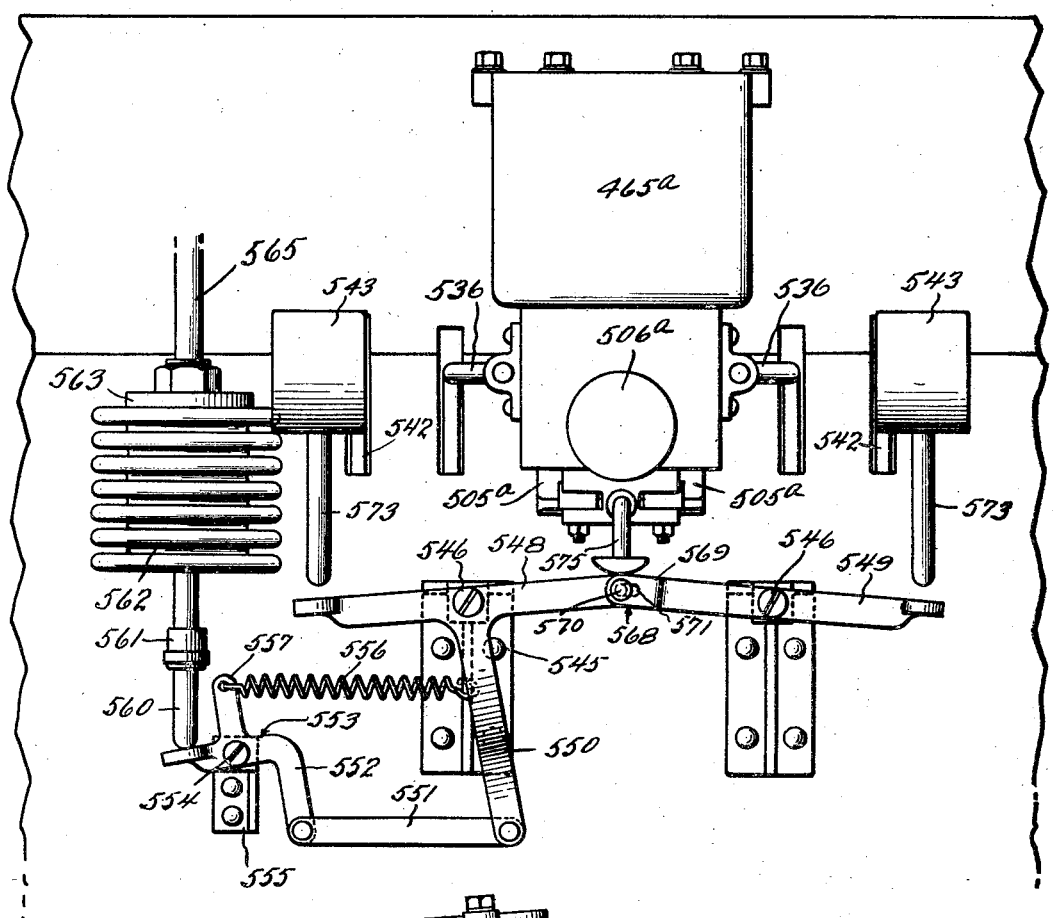
Figure 44:
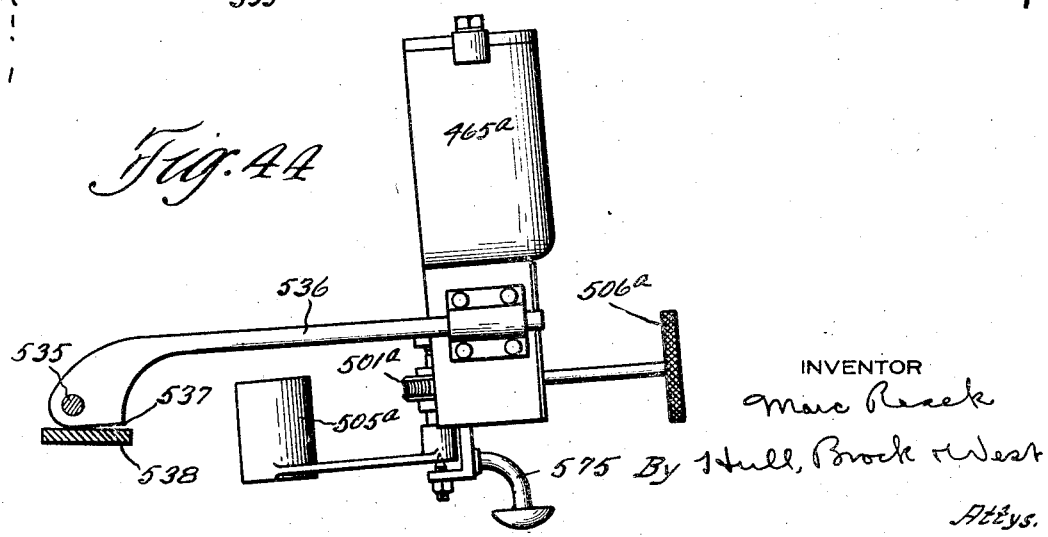

To the outer ends of brackets 545, which extend forwardly from the front wall of casing 450ª, are pivotally connected, as through screws 546, levers 548 and 549, the former being T-shaped, as shown in Fig. 43. The lower end of the stem 550 of the T-shaped lever, is connected through a link 551 with the lower end of a branch 552 of a bell crank lever 553. This lever is pivoted at 554 to a relatively short bracket 555 that extends from the front wall of the casing 450ª. The end portions of the link 551 are offset to meet the different planes of the two levers to which they are connected. A spring 556, which has one of its ends anchored to one of the brackets 545 and its opposite end connected to a branch 557 of the bell crank lever 553, tends to rock said lever in a clock-wise direction as the same is viewed from the front. Bearing upon an enlarged end portion of the bell crank lever 553, opposite the branch to which the link 551 is connected, is a pin 560 that is slidably engaged through a guide 561 and has its upper end connected to a bellows 562 that is supported through a bracket 563 from the casing 450ª. This bellows is shown as communicating, through a tube 565, with the boiler 566 of the furnace 470ª. Under this arrangement the steam pressure of the boiler is conducted to the bellows 562 to expand it when the steam pressure exceeds a predetermined value. In place of the tube 565 communicating with the boiler, it may connect with a thermostat of such character as that above described in connection with the first embodiment of the invention in which case the pressure created by the expansion of the thermal sensitive fluid in the container of the thermostat would be communicated through tube 565 to the bellows 562. The inner or adjacent ends of the levers 548 and 549 are united at 568 through a lost-motion connection. This is accomplished in the present instance by forming the end of lever 549 with a yoke 569 (Figs. 42 and 43) by and between the branches of which a pin 570 is supported which passes through a slot 571 in the end of lever 548 that enters between the branches of the yoke 569. The outer ends of the levers 548 and 549 terminate in heads which are disposed below pins 573 that depend from the previously mentioned weights 543.

Under normal conditions, the apparatus is under the control of the variable weight mechanism 465ª wherewith is associated the thermostatically controlled circuits described in connection with the second embodiment. In the event, however, of the temperature of the furnace rising to an abnormally high degree, the bellows 562 will be expanded, either in response to the steam pressure in the boiler 566 or to the temperature thereof whichever the case may be, and this will result in a depression of the pin 560 and a rocking of the bell crank lever 553 in a counter clock-wise direction which movement is imparted, through the link 551 to the connected levers 548 and 549, resulting in a lifting of their inner and connected ends and a depression of their outer ends. As their inner ends are elevated they engage a button 575 that is carried by the mechanism 465ª and lift said mechanism until the heels 537 of the arms 536 which support said mechanism are free from the ledges 538, thereby to remove most of the influence of the weight of said mechanism from the damper control lever 459ª. As the outer ends of the levers 548 and 549 descend they lower the arms 542 which carry the weights 543 until the heels 544 of said arms engage the ledges 538, and when the outer ends of said levers completely withdraw from the pins 573 of the weights 543, the influence of said weights is brought to bear upon the damper control lever. These weights being considerably lighter than the weight of mechanism 465ª permits the damper 453ª to close and shield the generator 467ª from the heat of the burner flame. As a result of this the steam pressure in the generator falls and the burner flame is accordingly decreased in size and its heat diminished. The damper remains closed until the pressure within the bellows 478ª is reduced to such an extent that it will permit the weights 543 to rock the lever 459ª in a direction to open the damper. When the condition of the furnace becomes normal the bellows 562 will be relaxed, lifting the pin 560 and allowing the spring 556 to return the levers 548 and 549 to their normal positions wherein they sustain the weights 543 through the pins 573 and allow the control mechanism 465ª to descend and impose its influence again upon the damper control lever.

*Anti-siphoning connections.*

(*Reference numerals 580 to 583.*)

In the description of the oil circulating system which constitutes a part of the first described embodiment of the invention, reference is made to suitable anti-siphoning connections betwen the oil pumping compartment 160 of the pumping apparatus 100 and the tank 162. The purpose of such connections, as the name implies, is to prevent siphoning of oil from the oil storage tank to the basement of the building wherein the oil burning apparatus is located in case a leak occurs in the piping; and of course such a safeguard is of use only in an installation of the character shown in Fig. 1 where the outside submerged oil tank is above the level of its connected piping within the building.

The anti-siphoning connections herein disclosed constitute, of themselves, no part of my invention, and they will be found illustrated and described in the January, 1925 issue (Vol. VI—No. 1) of "Laboratories' Data," a bulletin published by the Underwriters' Laboratories, of Chicago, Illinois.

Locating the fuel oil storage tank at a relatively high level is in most cases desirable if not made necessary by natural conditions, such as rock formations, ground water, and the like; and I have shown my invention in connection with this class of installations because of its peculiar adaptability to the anti-siphoning connections thereof. It is to be understood, however, that the invention is adapted for use with any of the prevailing anti-siphoning arrangements.

When the operation of the apparatus is started, the pumping apparatus creates a partial vacuum in the connections between the oil pumping chamber and the tank 162, and when this vacuum has become sufficient to overcome the oil head (Z, Fig. 1), oil is drawn from the storage tank 162, through the pipes 580 and 581 and is dropped into the top of the larger pipe 582. Entering from a smaller pipe the oil merely falls through or trickles down the sides of the larger pipe 582 collecting in the lower end thereof over the reduction fitting 583, whence it continues through the pipe 161 to the pumping apparatus. As the quantity of oil admitted through the pipes 580 and 581 can never exceed the amount removed through the pipe 161, there will prevail at all times a partial vacuum in the larger pipe 582 between the body of accumulated oil at its lower end and the oil in the pipes 580 and 581.

In the event of a break or leak at any point in the suction line, air is drawn into the piping, reducing the vacuum and stopping the flow of oil from the storage tank and allowing that within the pipe 580 and 581 to flow back into the tank.

Having thus described my invention, what I claim is:—

1. In apparatus of the character set forth, the combination of an oil burner of the injector type, a steam generator for supplying steam thereto, means regulating the pressure of steam in the generator, a thermostat for governing the aforesaid means, and a furnacestat operating independently of the thermostat for reducing the flame produced by the burner.

2. In apparatus of the character set forth, the combination of an oil burner of the injector type, a steam generator for supplying steam thereto, means regulating the pressure of steam in the generator, a thermostat for governing the aforesaid means, and a furnacestat operating independently of the thermostat for reducing the steam supply to the burner.

3. In combination, a burner of the injector type, a steam generator exposed to the products of combustion therefrom, a conduit leading from the steam generator to the burner, means for supplying oil to the burner, a damper shiftable to and from a position wherein it shields the generator from the burner flame, a weight operatively connected to the damper and tending to shift it from said position, a counter-balanced damper control lever, connections between said lever and the damper, and means subjected to the steam pressure in the generator for swinging the damper control lever in a direction to shift the damper toward generator-shielding position.

4. In combination, a burner of the injector type, a steam generator exposed to the products of combustion therefrom, a conduit leading from the steam generator to the burner, means for supplying oil to the burner, a balanced unit involving a damper and shiftable to and from a position wherein the damper shields the generator from the burner flame, a weight applied to said unit and tending to shift it in a direction to withdraw the damper from said position, a counterbalanced damper control lever, connections between said lever and the aforesaid unit, and means subjected to the steam pressure in the generator for swinging the damper control lever in a direction to shift said unit so as to carry the damper toward generator shielding position.

5. In combination, a burner of the injector type, a steam generator exposed to the products of combustion therefrom, a conduit leading from the steam generator to the burner, means for supplying oil to the burner, a damper shiftable to and from a position wherein it shields the generator from the burner flame, a weight operatively connected to the damper and tending to shift it from said position, a counterbalanced damper control lever, connections between said lever and the damper, means subjected to the steam pressure in the generator for swinging the damper control lever in a direction to shift the damper toward generator-shielding position, a movable weight carried by the damper control lever for opposing the action of the last mentioned means, and thermostatically controlled mechanism for moving said last mentioned weight.

6. In oil burning apparatus for firing a furnace, the combination of an injector burner, a steam generator arranged to receive heat from the burner flame, means for delivering oil to the burner, a conduit for conducting steam from the generator to the burner, a valve in said conduit, steam operated means subjected to the steam pressure in the generator for opening said valve, pressure operated means for closing the valve, and a pressure delivering furnacestat for actuating the last mentioned means.

7. In oil burning apparatus for firing a furnace, the combination of an injector burner, a steam generator arranged to receive heat from the burner flame, means for delivering oil to the burner, a conduit for conducting steam from the generator to the burner, a valve in said conduit, steam operated means subjected to the steam pressure in the generator for opening said valve, means for closing the valve, and a furnacestat for actuating the last mentioned means.

8. In combination, a furnace, a steam generator, a heating device for heating the same, an auxiliary heating device consisting of an injector burner, means for supplying oil to said burner, a conduit through which steam is conducted from the generator to the injector burner, a valve in said conduit, steam operated means subjected to the steam pressure in the generator for opening said valve, pressure operated means for closing the valve, and a pressure delivering furnacestat for actuating the last mentioned means.

9. In combination, a furnace, a steam generator, a heating device for heating the same, an auxiliary heating device consisting of an injector burner, means for supplying oil to said burner, a conduit through which steam is conducted from the generator to the injector burner, a valve in said conduit, steam operated means subjected to the steam pressure in the generator for opening said valve, means for closing the valve, and a furnacestat for actuating the last mentioned means.

10. In combination, a furnace, a steam generator, a heating device for heating the same, thermostatically controlled mechanism controlling the amount of heat delivered to the generator, an auxiliary heating device consisting of an injector burner, means for delivering oil to said burner, a conduit for conveying steam from the generator to the burner, a valve in said conduit, steam operated means subjected to steam pressure in the generator for opening said valve, pressure operated means for closing the valve, and a pressure delivering furnacestat for actuating the last mentioned means.

11. In oil burning apparatus for firing a furnace, the combination of a main and an auxiliary burner, said burners being of the injector type, a steam generator arranged to receive heat from the burner flames, means for automatically controlling the amount of heat delivered to the generator, means for supplying oil to the burners, conduits through which steam is conducted from the generator to the burners, a valve in the conduit leading to the auxiliary burner, steam operated means subjected to the steam pressure in the generator for opening said valve, pressure operated means for closing said valve, and a pressure delivering furnacestat for actuating the last mentioned means.

12. In oil burning apparatus for firing a furnace, the combination of a main and an auxiliary burner, said burners being of the injector type, a steam generator arranged to receive heat from the burner flames, means for automatically controlling the amount of heat delivered to the generator, means for supplying oil to the burners, conduits through which steam is conducted from the generator to the burners, a valve in the conduit leading to the auxiliary burner, steam operated means subjected to the steam pressure in the generator for opening said valve, means for closing said valve, and a furnacestat for actuating the last mentioned means.

13. In oil burning apparatus for firing a furnace, the combination of a main and an auxiliary burner, said burners being of the injector type, a steam generator arranged to receive heat from the burner flames, means governing the amount of heat delivered to the generator, thermostatically controlled mechanism for controlling said means, means for delivering oil to the burners, conduits for conducting steam from the generator to said burners, a valve in the conduit leading to the auxiliary burner, steam operated means subjected to the steam pressure in the generator for opening said valve, pressure operated means for closing the valve, and a pressure delivering furnacestat for actuating the last mentioned means.

14. In oil burning apparatus for firing a furnace, the combination of a main and an auxiliary burner, said burners being of the injector type, a steam generator arranged to receive heat from the burner flames, means governing the amount of heat delivered to the generator, thermostatically controlled mechanism for controlling said means, means for delivering oil to the burners, conduits for conducting steam from the generator to said burners, a valve in the conduit leading to the auxiliary burner, steam operated means subjected to the steam pressure in the generator for opening said valve, means for closing the valve, and a furnacestat for actuating the last mentioned means.

15. In oil burning apparatus for firing a furnace, the combination of a main and an auxiliary burner, said burners being of the injector type, a steam generator arranged to receive heat from the burner flames, a damper for intercepting the passage of heat from the burner flames to the generator, steam operated means subjected to the steam pressure in the generator for moving the damper toward generator-shielding position, a weight tending to move the damper from generator-shielding position, said weight being alterable to impose a variable influence on the damper, thermostatic mechanism for varying the influence of the weight on the damper according to temperature conditions, means for delivering oil to the burners, conduits through which steam is conducted from the generator to the burners, a valve in the conduit leading to the auxiliary burner, steam operated means subjected to the steam pressure in the generator for opening said valve, pressure operated means for closing the valve, and a pressure delivering furnacestat for actuating the last mentioned means.

16. In oil burning apparatus for firing a furnace, the combination of a main and an auxiliary burner, said burners being of the injector type, a steam generator arranged to receive heat from the burner flames, a damper for intercepting the passage of heat from the burner flames to the generator, steam operated means subjected to the steam pressure in the generator for moving the damper toward generator-shielding position, means tending to move the damper from generator-shielding position, said means being adjustable to impose a variable influence on the damper, thermostatic mechanism for varying the influence of said means on the damper according to temperature conditions, means for delivering oil to the burners, conduits through which steam is conducted from the generator to the burners, a valve in the conduit leading to the auxiliary burner, steam operated means subjected to the steam pressure in the generator for opening said valve, means for closing the valve, and a furnacestat for actuating the last mentioned means.

17. In combination, a furnace, a compartment heated by the furnace, a heating apparatus for firing the furnace and incorporating a main and an auxiliary burner, a thermostat subjected to the temperature of the compartment, means controlled by said thermostat for cutting on and off said auxiliary burner as the temperature of the compartment varies, a furnacestat subjected to the temperature of the furnace, and means controlled thereby for cutting off the auxiliary burner in case the temperature of the furnace exceeds a predetermined value.

18. A heating system comprising a furnace, a compartment heated by means of the furnace, a furnacestat actuated by the temperature of the furnace, a thermostat actuated by the temperature of the compartment, a main burner, auxiliary burners, means actuated by the thermostat for successively turning on and off the auxiliary burners as the temperature in the compartment varies, and means controlled by the furnacestat for turning off the auxiliary burners in case the temperature of the furnace exceeds a predetermined value.

19. A heating system comprising a furnace, a compartment heated by means of the furnace, a furnacestat actuated by the temperature of the furnace, a thermostat actuated by the temperature of the compartment, a plurality of steam induction liquid fuel burners producing heat in the furnace, a steam boiler for supplying steam to the burners, means actuated by the steam pressure to regulate the number of burners in communication with the steam supply, means controlled by the room thermostat for governing the steam pressure, and means controlled by the furnacestat for shutting off the steam supply to certain of the burners when the temperature of the furnace exceeds a predetermined maximum.

20. A heating system comprising a furnace, a compartment heated by means of the furnace, a furnacestat actuated by the temperature of the furnace, a thermostat actuated by the temperature of the compartment, a plurality of steam induction liquid fuel burners producing heat in the furnace, a steam boiler for supplying steam to the burners, a water supply, a pump driven by steam from the boiler for pumping water from said supply to said boiler, a liquid fuel system involving a receptacle, a second pump also driven by steam from said boiler for circulating fuel through said system, means for maintaining a substantially constant level in said receptacle, means actuated by the steam pressure in the boiler for regulating the number of burners supplied with steam, means controlled by the room thermostat for governing the steam pressure, means controlled by the furnacestat for shutting off the steam supply to certain of the burners when the temperature of the furnace exceeds a predetermined maximum, a valve in the connections between the fuel receptacle and the burners, and means to close said valve thereby to shut off the oil supply to all burners and completely extinguish the flame, said means being adapted to be actuated by overflow oil from the system.

21. A heating system comprising a furnace, a compartment heated by means of the furnace, a furnacestat actuated by the temperature of the furnace, a thermostat actuated by the temperature of the compartment, a plurality of steam induction liquid fuel burners producing heat in the furnace, a steam boiler for supplying steam to the burners, a water supply, a pump driven by steam from the boiler for pumping water from said supply to said boiler, a liquid fuel system involving a receptacle, a second pump also driven by steam from said boiler for circulating fuel through said system, means for maintaining a substantially constant level in said receptacle, means actuated by the steam pressure in the boiler for regulating the number of burners supplied with steam, means controlled by the room thermostat for governing the steam pressure, means controlled by the furnacestat for shutting off the steam supply to certain of the burners when the temperature of the furnace exceeds a predetermined maximum, a valve in the connections between the fuel receptacle and the burners, and means to close said valve thereby to shut off the oil supply to all burners and completely extinguish the flame, said means incorporating a thermo-sensitive element subjected to the temperature about the oil and which is affected to cause the actuation of said means when the temperature becomes unduly high.

22. A heating system comprising a furnace, a compartment heated by means of the furnace, a furnacestat actuated by the temperature of the furnace, a thermostat actuated by the temperature of the compartment, a plurality of steam induction liquid fuel burners producing heat in the furnace, a steam boiler for supplying steam to the burners, a water supply, a pump driven by steam from the boiler for pumping water from said supply to said boiler, a liquid fuel system involving a receptacle, a second pump also driven by steam from said boiler for circulating fuel through said system, means for maintaining a substantially constant level in said receptacle, means actuated by the steam pressure in the boiler for regulating the number of burners supplied with steam, means controlled by the room thermostat for governing the steam pressure, means controlled by the furnacestat for shutting off the steam supply to certain of the burners when the temperature of the furnace exceeds a predetermined maximum, a valve in the connections between the fuel receptacle and the burners, and means to close said valve thereby to shut off the oil supply to all burners and completely extinguish the flame, said means being manually operated.

23. In combination with a furnace, apparatus for firing the same comprising a steam generator, a heating device for heating the same, a thermostatically controlled mechanism for controlling the heat of said device thereby to govern the steam pressure in the generator according to temperature conditions, an auxiliary heating device in operative relation to the generator and consisting of an injector burner, means for supplying liquid fuel to the burner, a conduit for conducting steam from the generator to the burner, a valve in said conduit, means tending to close the valve, a diaphragm operatively connected to the valve for opening it when steam pressure is imposed upon the diaphragm, a casing applied to the diaphragm and communicating with the generator, pressure operated means for closing the valve, and a pressure delivering furnacestat for actuating the last mentioned means.

24. In combination with a furnace, apparatus for firing the same comprising a steam generator, a heating device for heating the same, a thermostatically controlled mechanism for controlling the heat of said device thereby to govern the steam pressure in the generator according to temperature conditions, an auxiliary heating device in operative relation to the generator and consisting of an injector burner, means for supplying liquid fuel to the burner, a conduit for conducting steam from the generator to the burner, a valve in said conduit, a weight tending to close the valve, a bellows operatively connected to the valve for opening it when the bellows is compressed, a casing enclosing the bellows and communicating with the generator, pressure operated means for closing the valve, and a pressure delivering furnacestat for actuating the last mentioned means.

25. In combination with a furnace, apparatus for firing the same comprising a steam generator, a heating device in operative relation thereto, a thermostatically controlled mechanism for controlling the heat of said device thereby to govern the steam pressure in the generator according to temperature conditions, a plurality of auxiliary heating devices in operative relation to the generator and consisting of injector burners, means for supplying liquid fuel to said burners, conduits for conducting steam from the generator to the burners, a valve in the conduit leading to each burner, a weight tending to close each valve, the weights of the different valves being of differing influence, a diaphragm operatively connected to each valve for opening it when the diaphragm is actuated by pressure imposed thereon, a casing applied to the diaphragms with a fluid tight joint and communicating with the generator, pressure, operated means for closing the valves, and a pressure delivering furnacestat for actuating the last mentioned means.

26. In combination, a steam generator, a heating device in operative relation thereto, a thermostatically controlled mechanism for controlling the heat of said device thereby to govern the steam pressure in the generator according to temperature conditions, a plurality of auxiliary heating devices in operative relation to the generator and consisting of injector burners, means for supplying liquid fuel to said burners, conduits for conducting steam from the generator to the burners, a valve in the conduit to each burner, a weight tending to close each valve, the weights of the different valves being of different influence, a diaphragm operatively connected to each valve for opening it when the diaphragm is actuated by pressure imposed thereon, and a casing applied to the diaphragms with a fluid tight joint and communicating with the generator.

27. In combination with a furnace, apparatus for firing the same comprising a steam generator, a heating device in operative relation thereto, a thermostatically controlled mechanism for controlling the heat of said device thereby to govern the steam pressure in the generator according to temperature conditions, a plurality of auxiliary heating devices in operative relation to the generator each consisting of an injector burner, means for supplying liquid fuel to each burner, a conduit for conducting steam from the generator to each of the burners, a valve in each conduit, a weight tending to close each valve, the weights associated with the different valves differing in influence, a bellows operatively connected to each valve for opening it when the bellows is compressed, a casing enclosing the plurality of bellows, a conduit through which said casing communicates with the generator, pressure operated means for closing the valves, and a pressure delivering furnacestat for actuating the last mentioned means.

28. In combination with a furnace, apparatus for firing the same comprising a steam generator, a heating device in operative relation thereto, a thermostatically controlled mechanism for controlling the heat of said device thereby to govern the steam pressure in the generator according to temperature conditions, a plurality of auxiliary heating devices in operative relation to the generator, each consisting of an injector burner, means for supplying liquid fuel to each burner, a conduit for conducting steam from the generator to each of the burners, a valve in each conduit, a weight tending to close each valve, the weights associated with the different valves differing in influence, a bellows operatively connected to each valve for opening it when the bellows is compressed, a casing enclosing the plurality of bellows, a conduit through which said casing communicates with the generator, means for depressing the aforesaid weights thereby to close the valve, a bellows wherewith said means is operatively connected, and a pressure delivering furnacestat communicating with the last mentioned bellows.

29. In combination with a furnace, apparatus for firing the same comprising a steam generator, a heating device in operative relation thereto, a thermostatically controlled mechanism for controlling the heat of said device thereby to govern the steam pressure in the generator according to temperature conditions, a plurality of auxiliary heating devices in operative relation to the generator, each consisting of an injector burner, means for supplying liquid fuel to each burner, a conduit for conducting steam from the generator to each of the burners, a valve in each conduit, a weight tending to close each valve, the weights associated with the different valves differing in influence, a bellows operatively connected to each valve for opening it when the bellows is compressed, a casing enclosing the plurality of bellows, a conduit through which said casing communicates with the generator, a member disposed in operative relation to the aforesaid weights, a bellows having operative connection with said member thereby to depress the weights through the intervention of said member when the bellows is expanded, and a pressure delivering furnacestat communicating with the last mentioned bellows.

30. In combination with a furnace, apparatus for firing the same comprising a steam generator, a heating device in operative relation thereto, a thermostatically controlled mechanism for controlling the heat of said device thereby to govern the steam pressure in the generator according to temperature conditions, a plurality of auxiliary heating devices in operative relation to the generator, each consisting of an injector burner, means for supplying liquid fuel to each burner, a conduit for conducting steam to each of the burners, a casing from which the conduits of the plurality of burners lead, a valve for controlling communication between the interior of the casing and each conduit, a bellows operatively connected with each valve and enclosed within said casing and having fluid tight connection with the casing, the interiors of the bellows being vented to the atmosphere, a lever associated with each valve and pivotally connected to the casing, operative connections between each lever and the corresponding valve whereby when the lever is depressed the valve will be closed, a weight applied to and tending to depress each lever, a conduit through which said casing communicates with the generator, a member arranged to depress the levers, a bellows having operative connection with said member thereby to depress the same when the bellows is expanded, and a pressure delivering furnacestat in communication with the last mentioned bellows.

31. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight carried by said lever and movable toward and from the fulcrum of the lever, and electromagnetic mechanism carried by the lever for so moving said weight.

32. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight pivoted to said lever so as to swing toward and from the fulcrum of the lever, and electromagnetic mechanism carried by the lever for swinging the weight.

33. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight pivoted to said lever so as to swing toward and from the fulcrum of the lever, electromagnetic mechanism carried by the lever for so swinging the weight, and manually operated means for swinging the weight.

34. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight pivoted to said lever so as to swing toward and from the fulcrum of the lever, electromagnetic mechanism carried by the lever for so swinging the weight, a casing enclosing the foregoing parts, and manually operated means for adjusting the weight and having an operating handle accessible from outside the casing.

35. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight movable on said lever toward and from the fulcrum thereof, electromagnetic mechanism carried by the lever for so moving said weight, a casing enclosing the foregoing parts, manually operated means for adjusting the weight and having an operating handle accessible from outside the casing, and indicating mechanism operatively connected with the weight for showing its adjusted condition.

36. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight pivoted to said lever so as to swing toward and from the fulcrum thereof, a shaft rotatably supported by the lever, driving connection between said shaft and the weight whereby when the shaft is rotated in opposite directions the weight will be oscillated on its pivot, and electro-magnetic mechanism carried by the lever for so rotating the shaft.

37. In fuel oil burning apparatus, the combination of an injector burner, a steam generator arranged to receive heat from the flame thereof, means for supplying oil to the burner, a conduit for conducting steam from the generator to the burner, a damper intercepting the passage of heat from the burner flame to the generator, a weight tending to move the damper from generator-shielding position, a pivotally supported damper control lever, connections between the free end of said lever and the damper, steam operated means subjected to the steam pressure in the generator for swinging the lever in a direction to move the damper toward generator-shielding position, a weight pivoted to said lever so as to swing toward and from the fulcrum thereof, a shaft rotatably supported by the lever, driving connection between said shaft and the weight whereby when the shaft is rotated in opposite directions the weight will be oscillated on its pivot, solenoids carried by said lever, and driving connections between the movable core sections of said solenoids and said shaft whereby when one solenoid is energized it will rotate the shaft in one direction and when the other solenoid is energized it will rotate the shaft in the opposite direction.

38. In combination, a heating device, an element movable in one direction to increase, and in another direction to decrease, the heat thereof, electromagnetic mechanism, a branched electric circuit involving said mechanism, the mechanism acting to move the aforesaid element in one direction when energized through one branch, and in the other direction when energized through the other branch, a thermostatic switch for selecting the branches according to temperature conditions, an intermittently operated switch in the circuit, and a switch in each of said branches that is opened when the element has been moved a predetermined distance in the direction corresponding to such branch.

39. In mechanism of the character set forth, the combination of a solenoid arranged with its axis substantially vertical, a plate pivoted to its movable core, a pawl on said plate, a ratchet wheel wherewith said pawl cooperates, and a guide for deflecting the plate thereby to withdraw the pawl from the wheel as the plate drops through gravitation of the solenoid core.

40. In mechanism of the character set forth, the combination of a solenoid arranged with its axis substantially vertical, a plate pivoted to its movable core, a pawl on said plate, a ratchet wheel wherewith said pawl cooperates, and a guide for deflecting the plate thereby to withdraw the pawl from the wheel as the plate drops through gravitation of the solenoid core, one edge of the plate being turned over on itself to increase its bulk and constitute a weight for swinging the plate in a direction to engage the pawl with the ratchet wheel as the plate is lifted.

41. In mechanism of the character set forth, the combination of a solenoid arranged with its axis substantially vertical, a plate pivoted to its movable core, a pawl on said plate, a shaft, and a ratchet wheel on said shaft and wherewith said pawl cooperates, said plate having an inclined edge engaging the shaft and serving as a guide for deflecting the plate thereby to withdraw the pawl from the wheel as the plate drops by gravity.

42. In mechanism of the character set forth, the combination of two solenoids arranged side by side with their axes substantially vertical, a plate pivoted to the movable core of each solenoid, a pawl carried by each plate, two substantially parallel shafts, a ratchet wheel on each shaft and wherewith one of said pawls is adapted to cooperate, means for deflecting each plate thereby to withdraw its pawl from the corresponding ratchet wheel as the plate drops by gravity, a gear on each shaft, and an idler through which the gear on one shaft has driving connection with the gear on the other shaft.

43. In mechanism of the character set forth, the combination of two solenoids arranged side by side with their axes substantially vertical, a plate pivoted to the movable core of each solenoid, a pawl carried by each plate, the plates being in opposed relation to each other and having their outer edges weighted whereby the plates tend to swing inwardly, two substantially parallel shafts, a ratchet wheel on each shaft and wherewith one of said pawls is adapted to cooperate, the inner edges of the plates being inclined and arranged to engage said shafts whereby the plates are swung outwardly thereby to withdraw the pawls from the wheels as the plates drop, a gear on each shaft, and an idler through which the gear on one shaft has driving connection with the gear on the other shaft.

In testimony whereof, I hereunto affix my signature.

MARC RESEK.